United States Patent
Chakladar et al.

(10) Patent No.: US 10,354,643 B2
(45) Date of Patent: Jul. 16, 2019

(54) METHOD FOR RECOGNIZING VOICE SIGNAL AND ELECTRONIC DEVICE SUPPORTING THE SAME

(71) Applicant: Samsung Electronics Co., Ltd., Gyeonggi-do (KR)

(72) Inventors: Subhojit Chakladar, Gyeonggi-do (KR); Junhui Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 66 days.

(21) Appl. No.: 15/292,951

(22) Filed: Oct. 13, 2016

(65) Prior Publication Data

US 2017/0110117 A1 Apr. 20, 2017

(30) Foreign Application Priority Data

Oct. 15, 2015 (KR) .................. 10-2015-0144099

(51) Int. Cl.
| | | |
|---|---|---|
| G10L 15/00 | (2013.01) | |
| G10L 15/06 | (2013.01) | |
| G10L 15/14 | (2006.01) | |
| G10L 15/16 | (2006.01) | |
| G10L 15/22 | (2006.01) | |
| G10L 15/30 | (2013.01) | |

(52) U.S. Cl.
CPC .......... *G10L 15/063* (2013.01); *G10L 15/142* (2013.01); *G10L 15/16* (2013.01); *G10L 15/22* (2013.01); *G10L 15/30* (2013.01); *G10L 2015/223* (2013.01)

(58) Field of Classification Search
CPC ...................................... G10L 15/00
USPC .......... 704/9, 255, 254, 243, 240, 235, 234; 706/12; 703/2; 700/83
See application file for complete search history.

(56) References Cited

U.S. PATENT DOCUMENTS

| | | | | |
|---|---|---|---|---|
| 5,729,656 A | * | 3/1998 | Nahamoo | G10L 15/04 704/254 |
| 6,081,660 A | * | 6/2000 | Macleod | G10L 17/00 703/2 |
| 6,138,095 A | * | 10/2000 | Gupta | G10L 15/08 704/233 |
| 6,324,510 B1 | * | 11/2001 | Waibel | G10L 15/02 704/232 |
| 6,556,969 B1 | * | 4/2003 | Assaleh | G10L 17/00 704/243 |

(Continued)

*Primary Examiner* — Michael C Colucci
(74) *Attorney, Agent, or Firm* — The Farrell Law Firm, P.C.

(57) ABSTRACT

An electronic device is provided including at least one microphone, a communication circuit, a processor and a memory, wherein the memory stores at least one application program or a software program executing a voice instruction, which is triggered in response to a voice input, upon the performance, the memory stores instructions to allow the processor to sequentially receive a plurality of utterances including a first speech element from a first user through the at least one microphone, generate a voice recognition model of the first user on the basis of at least some of the plurality of utterances, store the generated voice recognition model in the memory, and transmit the generated voice recognition model of the first user to the outside through the communication circuit so that a first external device uses the generated voice recognition model of the first user.

26 Claims, 18 Drawing Sheets

(56) References Cited

U.S. PATENT DOCUMENTS

| | | | | |
|---|---|---|---|---|
| 6,640,145 | B2* | 10/2003 | Hoffberg | G05B 19/0426 |
| | | | | 700/17 |
| 7,827,032 | B2* | 11/2010 | Braho | G10L 15/01 |
| | | | | 704/251 |
| 8,738,376 | B1* | 5/2014 | Goel | G10L 15/14 |
| | | | | 704/205 |
| 2006/0178880 | A1* | 8/2006 | Zhang | G10L 21/0208 |
| | | | | 704/233 |
| 2007/0192101 | A1* | 8/2007 | Braho | G10L 15/065 |
| | | | | 704/251 |
| 2010/0268536 | A1* | 10/2010 | Suendermann | G10L 15/063 |
| | | | | 704/243 |
| 2011/0060587 | A1* | 3/2011 | Phillips | G10L 15/30 |
| | | | | 704/235 |
| 2013/0030802 | A1* | 1/2013 | Jia | G10L 15/06 |
| | | | | 704/231 |
| 2013/0325448 | A1* | 12/2013 | Levien | G10L 19/00 |
| | | | | 704/201 |
| 2015/0025890 | A1* | 1/2015 | Jagatheesan | G10L 15/32 |
| | | | | 704/255 |
| 2015/0089091 | A1 | 3/2015 | Tucker | |
| 2015/0370784 | A1* | 12/2015 | Nissan | G06F 17/2809 |
| | | | | 704/2 |
| 2015/0379988 | A1* | 12/2015 | Corfield | G10L 15/183 |
| | | | | 704/255 |
| 2016/0063397 | A1* | 3/2016 | Ylipaavalniemi | G06K 9/6221 |
| | | | | 706/12 |
| 2016/0314795 | A1* | 10/2016 | Baum | G10L 19/018 |

* cited by examiner

METHOD FOR RECOGNIZING VOICE SIGNAL AND ELECTRONIC DEVICE SUPPORTING THE SAME

PRIORITY

This application claims priority under 35 U.S.C. § 119(a) to Korean Patent Application Serial No. 10-2015-0144099 which was filed on Oct. 15, 2015, in the Korean Intellectual Property Office, the entire disclosure of which is incorporated herein by reference.

BACKGROUND

1. Field of the Disclosure

The present disclosure generally relates to a method for recognizing a voice signal, and more particularly, to a method for recognizing a voice signal and an electronic device supporting the same.

2. Description of the Related Art

An electronic device that performs various functions has become a modern necessity. The electronic device may provide various data transmission services and various additional services as well as a voice communication service, and thus perform as multimedia communication devices.

Users of the electronic device perform a touch input event on applications corresponding to their desired functions to use the additional services. With the recent development of technology, the electronic device performs the functions of the applications by inputting the user's voice as well as the touch input event. To perform the functions, the electronic device may activate a separate voice recognition program and then receive a voice input corresponding to the desired application. The separate voice recognition program may be activated by the user voice input including specific words, constructions, sentences, and the like.

When users using several electronic devices use the activated voice recognition program to execute their desired applications, they need to individually input a voice, which may activate the voice recognition program, to each electronic device which may cause inconvenience to a user.

SUMMARY

Accordingly, embodiments of the present disclosure are directed to a method for adaptively recognizing a received voice signal and an electronic device supporting the same.

An aspect of the present disclosure is directed to an electronic device which includes at least one microphone, a communication circuit, a processor electrically connected to the at least one microphone and the communication circuit, and a memory electrically connected to the processor, wherein the memory stores at least one application program or a software program executing a voice instruction, which is triggered in response to a voice input, upon the performance, the memory stores instructions to allow the processor to sequentially receive a plurality of utterances including a first speech element from a first user through the at least one microphone, generate a voice recognition model of the first user on the basis of at least some of the plurality of utterances, store the generated voice recognition model in the memory, and transmit the generated voice recognition model of the first user to the outside through the communication circuit so that a first external device uses the generated voice recognition model of the first user, when performing the voice recognition on the utterances including the first speech element of the first user.

Another aspect of the present disclosure is directed to an electronic device which includes a communication circuit configured to communicate with a first external device including a first microphone and a second external electronic device including a second microphone, a processor electrically connected to the communication circuit, and a memory electrically connected to the processor, wherein upon performance, the memory stores instructions to allow the processor to receive a voice recognition model of the first user, which is generated by sequentially receiving a plurality of utterances including a first speech element received from a first user through the first microphone of the first external electronic device from the first external electronic device, through the communication circuit, store the received voice recognition model of the first user in the memory, receive a transmission request of the voice recognition model of the first user from the second external electronic device through the communication circuit, and transmit the generated voice recognition model of the first user to the second external electronic device through the communication circuit so that the second external electronic device uses the generated voice recognition model of the first user when performing the voice recognition on the utterances including the first speech element of the first user in response to the received request.

Another aspect of the present disclosure is directed to an electronic device which includes a communication circuit, at least one microphone, a processor electrically connected to the communication circuit and the at least one microphone, and a memory electrically connected to the processor, wherein the memory stores at least one application program or a software program executing voice instructions, which is triggered in response to a voice input and upon performance, the memory stores instructions to allow the processor to transmit a signal requesting a voice recognition model of a first user, which is generated by sequentially receiving a plurality of utterances including a first speech element received from the first user through a first microphone of a first external electronic device, to the outside through the communication circuit, receive the voice recognition model of the first user provided as a response to the requesting signal through the communication circuit, store the received voice recognition mode of the first user in the memory, receive the utterances including the first speech element from the first user through the at least one microphone, and perform voice recognition on the received utterances on the basis of at least some of the stored voice recognition model of the first user.

Another aspect of the present disclosure is directed to a voice recognition method of an electronic device which includes sequentially receiving a plurality of utterances including a first speech element from a first user though at least one microphone, generating a voice recognition model of the first user on the basis of at least some of the plurality of utterances, storing the generated voice recognition model in the memory, and transmitting the generated voice recognition model of the first user to the outside through the communication circuit so that a first external device uses the generated voice recognition model of the first user, when performing the voice recognition on the utterances including the first speech element of the first user.

Another aspect of the present disclosure is directed to a voice recognition method of an electronic device which includes receiving a voice recognition model of a first user, which is generated by sequentially receiving a plurality of utterances including a first speech element received from the first user through a first microphone of a first external electronic device from the first external electronic device, through a communication circuit, storing the received voice recognition model of the first user in a memory, receiving a transmission request of the voice recognition model of the first user from a second external electronic device through the communication circuit, and transmitting the generated voice recognition model of the first user to the second external electronic device through the communication circuit so that the second external electronic device uses the generated voice recognition model of the first user when performing the voice recognition on the utterances including the first speech element of the first user in response to the received request.

Another aspect of the present disclosure is directed to the provision of a voice recognition method of an electronic device which includes transmitting a signal requesting a voice recognition model of a first user, which is generated by sequentially receiving a plurality of utterances including a first speech element received from the first user through a first microphone of a first external electronic device, to the outside through the communication circuit, an operating of receiving the voice recognition model of the first user provided as a response to the requesting signal through the communication circuit, storing the received voice recognition model of the first user in a memory, receiving the utterances including the first speech element from the first user through the at least one microphone, and performing the voice recognition on the received utterances on the basis of at least some of the stored voice recognition model of the first user.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
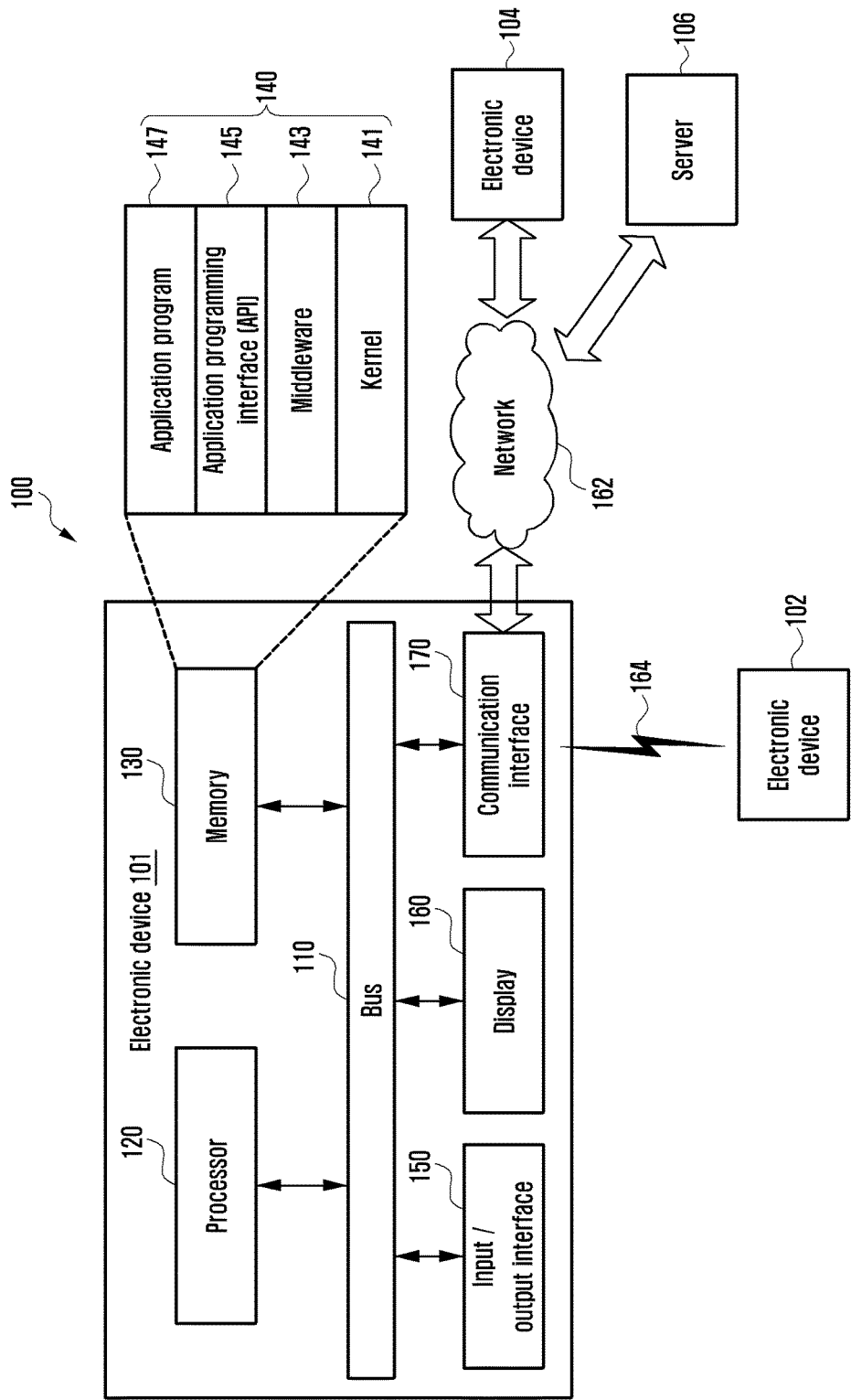
FIG. 1 is a block diagram illustrating a network environment, according to an embodiment of the present disclosure.

The following description, with reference to the accompanying drawings, is provided to assist in a comprehensive understanding of an embodiment of the present disclosure as defined by the claims and their equivalents. It includes details to assist in that understanding which are to be regarded as examples. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

Expressions such as "include" and "may include" which may be used in the present disclosure denote the presence of the disclosed functions, operations, and constituent elements and do not limit one or more additional functions, operations, and constituent elements. In the present disclosure, terms such as "include" and/or "have" may be construed to denote a certain characteristic, number, step, operation, constituent element, component or a combination thereof, but may not be construed to exclude the existence of, or a possibility of, the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely to distinguish an element from the other elements. For example, a first user device and a second user device indicate different user devices although both are user devices. For example, a first element may be referred to as a second element, and similarly, a second element may also be referred to as a first element without departing from the scope of the present disclosure.

In the case where a component is referred to as being "connected" to, or "accessed" by another component, it should be understood that not only is the component directly connected to or accessed by the other component, but there may also exist another component between them. Meanwhile, in the case where a component is referred to as being "directly connected to" or "directly accessed by" another component, it should be understood that there is no component therebetween.

The terms used in the present disclosure are only used to describe specific embodiments, and do not limit the present disclosure. As used herein, singular forms are intended to include plural forms as well, unless the context clearly indicates otherwise.

According to an embodiment of the present disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD)) such as electronic eyeglasses, electronic clothes, an electronic bracelet, an electronic necklace, an electronic appcessory, or a smart watch).

According to an embodiment of the present disclosure, an electronic device may be a smart home appliance that involves a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to an embodiment of the present disclosure, an electronic device may include various medical devices (for example, various kinds of portable medical measuring device (blood glucose meter, heart rate meter, blood pressure meter, or a temperature measuring instrument, etc.), magnetic resonance angiography (MRA), magnetic resonance imaging (MRI), computed tomography (CT), camcorder, etc., navigation devices, global positioning system receiver (GPS) receiver, event data recorder (EDR), flight data recorder (FDR), automotive infotainment devices, marine electronic equipment (e.g., marine navigation systems, gyrocompass, etc.), aviation electronics, security devices, automotive head unit, industrial or household robots, financial institutions, automatic teller machines (ATM), point of sales (POS) terminals, or Internet of Things (IoT) devices (e.g. light bulbs, various sensors, electric or gas meters, sprinkler systems, fire alarms, thermostat, street lights, toaster, fitness equipment, hot water tank, a heater, a boiler, etc.).

According to an embodiment of the present disclosure, an electronic device may be furniture or a building/structure of the portion, an electronic board, an electronic sign-receiving device (electronic signature receiving device), a projector, or various measuring devices (e.g. water, electricity, gas, or a radio wave measuring equipment, etc.). The electronic device may be one or more combinations of the various devices described above. The electronic device may be a flexible electronic device. In addition, an electronic device is not limited to the above-described device, and may include a new electronic device, in accordance with new technological developments. In this document, the term user refers to a human or an electronic device using the electronic device (for example, an artificial intelligence electronic device).

FIG. 1 is a block diagram illustrating a network environment 100 including an electronic device 101 in accordance with an embodiment of the present disclosure. Referring to FIG. 1, the electronic device 101 includes a bus 110, a processor 120, a memory 130, an input/output interface 150, a display 160, and a communication interface 170.

The bus 110 may be a circuit designed for connecting the above-discussed elements and communicating data (e.g., a control messages) between such elements.

The processor 120 may receive commands from the other elements (e.g., the memory 130, the input/output interface 150, the display 160, or the communication interface 170, etc.) through the bus 110, interpret the received commands, and perform arithmetic or data processing based on the interpreted commands.

The memory 130 may store therein commands or data received from, or created at, the processor 120 or other elements (e.g., the input/output interface 150, the display 160, or the communication interface 170, etc.). The memory 130 includes programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 may be used by one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may deliver commands or data, entered by a user through an input/output unit (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of content (e.g., text, images, videos, icons, or symbols) for users. The display module 160 may include a touch screen, and may receive, for example, a touch, gesture, proximity, or hovering input by using an electronic device or a part of the user's body.

The communication interface 170 may perform communication between the electronic device 101 and the electronic device 104 or the server 106. For example, the communication interface 170 may communicate with any external device by being connected with a network 162 through a wired or wireless communication.

The wireless communication may include, but is not limited to, at least one of wireless fidelity (WiFi), Bluetooth (BT), near field communication (NFC), global navigation satellite system (GNSS), or a cellular communication (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (WiBro), global system for mobile communications (GSM), etc.). The GNSS may include at least one of global positioning system (GPS), global navigation satellite system (Glonass), Beidou navigation satellite system (Beidou) or Galileo, the European global satellite-based navigation system. Hereinafter, the terms "GPS" and the "GNSS" may be interchangeably used herein. The wired communication may include, at least one of universal serial bus (USB), high definition multimedia interface (HDMI), RS-232 (recommended standard 232), or plain old telephone service (POTS). The network 162 includes, as a telecommunications network at least one of a computer network (e.g., local area network (LAN) or wide area network (WAN)), the Internet, and a telephone network.

The types of the first and second external electronic devices 102 and 104 may be the same as, or different from, the type of the electronic device 101. The server 106 may include a group of one or more servers. A portion or all of operations performed in the electronic device 101 may be performed in one or more other electronic devices 102, 104 or the server 106. In the case where the electronic device 101 performs a certain function or service automatically or in response to a request, the electronic device 101 may request at least a portion of functions related to the function or service from another electronic device 102, 104 or the server 106 instead of, or in addition to, performing the function or service for itself. The other electronic device 102, 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
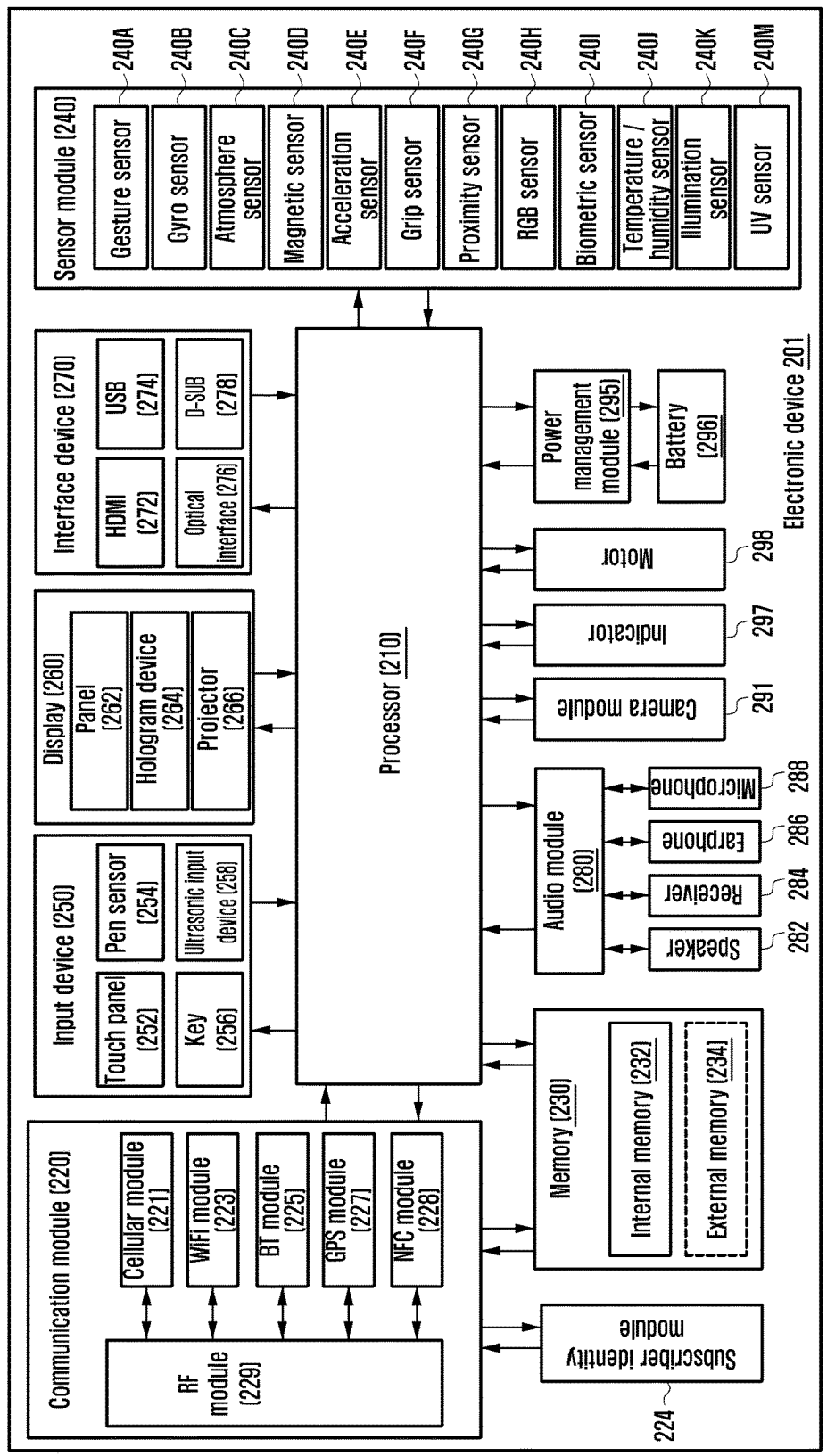
FIG. 2 is a block diagram of an electronic device, according to an embodiment of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. According to an embodiment of the present disclosure, the AP 210 may further include a graphic processing unit (GPU).

The communication module 220 (e.g., the communication interface 170) may perform data communication with the electronic device 104 or the server 106 connected to the electronic device 201 (e.g., the electronic device 101) through the network. According to an embodiment of the present disclosure, the communication module 220 may include therein a cellular module 221, a WiFi module 223, a BT module 225, a GNSS module 227, an NFC module 228, and an RF (radio frequency) module 229.

The cellular module 221 may offer a voice call, a video call, a message service, an Internet service, and the like through a communication network (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (WiBro), global system for mobile communications (GSM), wireless fidelity (Wi-Fi), Bluetooth, and near field communications (NFC) etc.). Additionally, the cellular module 221 may perform identification and authentication of the electronic device in the communication network, using the SIM card 224. The cellular module 221 may perform at least part of functions the AP 210 may provide. For example, the cellular module 221 may perform at least part of a multimedia control function. Each of the WiFi module 223, the BT module 225, the GNSS module 227 and the NFC module 228 may include a processor for processing data transmitted or received. Although FIG. 2 shows the cellular module 221, the WiFi module 223, the BT module 225, the GNSS module 227 and the NFC module 228 as different blocks, at least part of them may be contained in a single IC (integrated circuit) chip or a single IC package.

The RF module 229 may transmit and receive data, e.g., RF signals or any other electric signals. The RF module 229 may include a transceiver, a PAM (power amp module), a frequency filter, an LNA (low noise amplifier), and the like. Although FIG. 2 shows that the cellular module 221, the WiFi module 223, the BT module 225, the GNSS module 227 and the NFC module 228 share the RF module 229, at least one of them may perform transmission and reception of RF signals through a separate RF module.

The SIM card 224 may include, for example, an embedded SIM including a user identification module, and may include unique identification information (e.g., an integrated circuit card identifier (ICCID)) or subscriber information (e.g., international mobile subscriber identity (IMSI)).

The memory 230 includes an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (micro-SD), a mini-secure digital (mini-SD), an extreme digital (xD), a memory stick, and the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 includes, for example, at least one of a gesture sensor 240A, a gyro sensor 240B, an atmospheric (e.g., barometer or barometric) sensor 240C, a magnetic sensor 240D, an acceleration sensor 240E, a grip sensor 240F, a proximity sensor 240G, a color sensor 240H (e.g., RGB or "red, green, blue" sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input unit 250 includes a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user. The pen sensor 254, for example, may be implemented by using a method identical or similar to a method of receiving a touch input from the user, or by using a separate sheet for recognition. For example, a key pad or a touch key may be used similar to the keys 256. The ultrasonic input unit 258 enables the terminal to sense a sound wave by using a microphone 288 of the terminal through a pen generating an ultrasonic signal, and to identify data.

The display 260 (e.g., the display 160) includes a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, an high-definition multimedia interface (HDMI) 272, a universal serial bus (USB) 274, an optical interface 276, or a D-sub-miniature (D-sub) 278. The interface 270 may be contained, for example, in the communication interface 170 shown in FIG. 1. Additionally or alternatively, the interface 270 may include, for example, an mobile high-definition link (MHL) interface, a secure digital (SD) card/multi-media card (MMC) interface, or an infrared data association (IrDA) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present disclosure, the camera module 291 may include at least one image sensor (e.g., a front sensor or a rear sensor), a lens, an ISP (image signal processor), or a flash (e.g., LED or xenon lamp, not shown).

The power management module 295 may manage electric power of the electronic device 201. The power management module 295 may include, for example, a power management integrated circuit (PMIC), a charger integrated circuit (IC), or a battery gauge. The PMIC may be implemented by, for example, an IC or a system on chip (SoC) semiconductor. Charging methods may be classified into a wired charging method and a wireless charging method. A wireless charging type may include, for example, a magnetic resonance type, a magnetic induction type, or an electromagnetic type. Any additional circuit for wireless charging may be further used such as a coil loop, a resonance circuit, or a rectifier. The battery gauge may measure the residual charge amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. The electronic device 201 may include a specific processor (e.g., GPU) for supporting a mobile TV. This processor may process media data that comply with standards of digital multimedia broadcasting (DMB), digital video broadcasting (DVB), or MediaFlo.

Each of the above-discussed elements of the electronic device disclosed herein may be formed of one or more components, and its name may vary according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
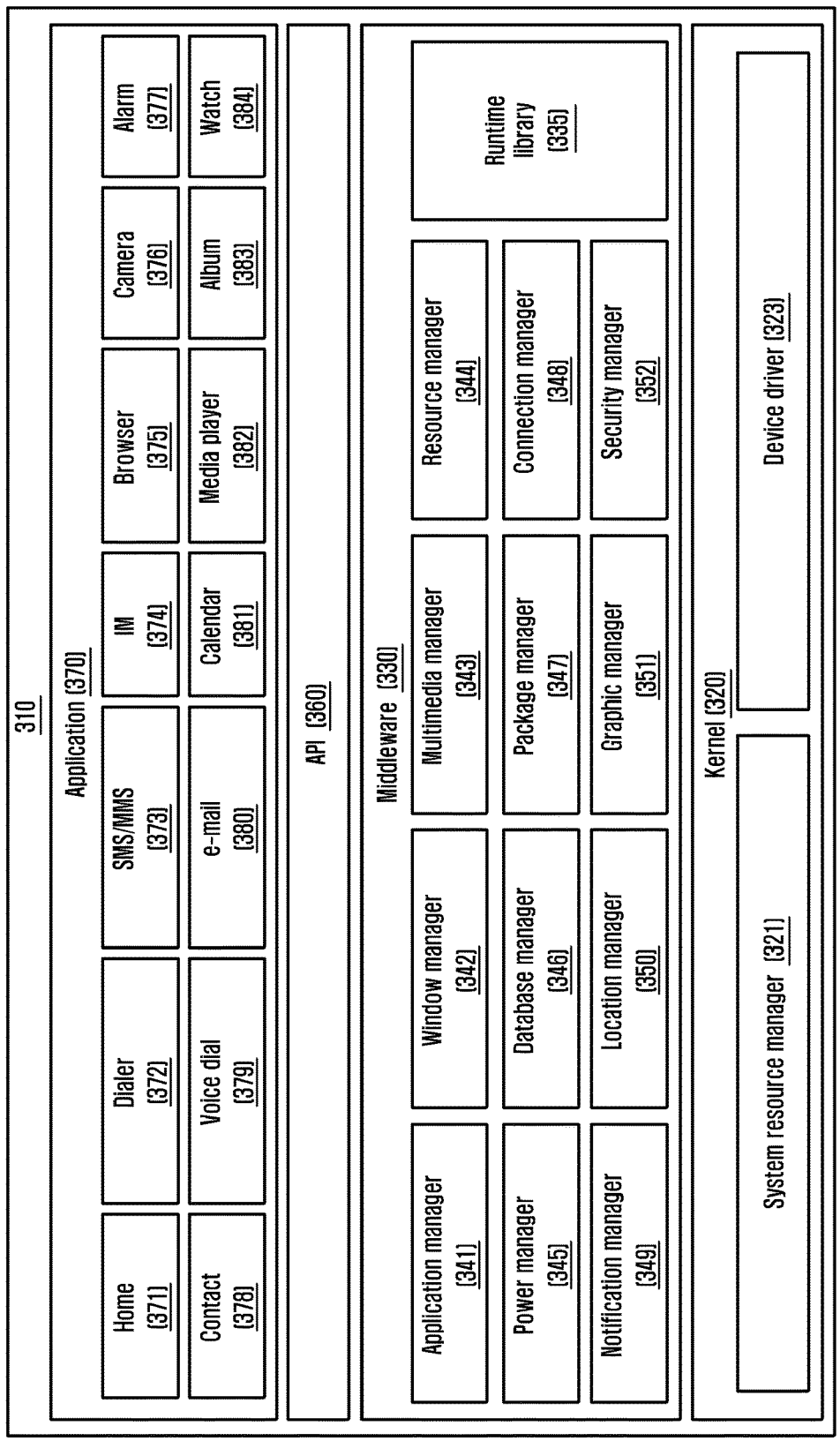
FIG. 3 is a block diagram of a program module, according to an embodiment of the present disclosure.

FIG. 3 is a block diagram illustrating a program module, according to an embodiment of the present disclosure.

Referring to FIG. 3, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™, Windows™, Symbian™, Tizen™, or Bada™.

The program module 310 includes a kernel 320, middleware 330, an API 360, and/or an application 370. At least a part of the program module 310 may be preloaded on the electronic device or may be downloaded from the electronic device 104 or the server 106.

The kernel 320 (e.g., the kernel 141 of FIG. 1) includes a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. The middleware 330 (e.g., middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352. The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats necessary to play various media files and use a codec appropriate for a format to perform encoding or decoding on media files. The resource manager 344 may manage resources, such as source code of at least one of the applications 370, memory and/or storage space. The power manager 345 may operate together with, e.g., a basic input/output system (BIOS) to manage battery or power and provide power information necessary for operating the electronic device. The database manager 346 may generate, search, and/or query a database to be used in at least one of the applications 370. The package manager 347 may manage installation or update of an application that is distributed in the form of a package file. The connectivity manager 348 may manage wireless connectivity, such as, e.g., Wi-Fi or BT. The notification manager 349 may display or notify an event, such as an incoming message, appointment, and/or proximity notification without interfering with the user.

The location manager 350 may manage location information on the electronic device. The graphic manager 351 may manage graphic effects to be offered to the user and their related user interface. The security manager 352 may provide various security functions necessary for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application program 147) includes one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar level), and/or environmental information (e.g., provision of air pressure, moisture, or temperature information). The application 370 may include an information exchanging application supporting information exchange between the electronic device (e.g., the electronic device 101) and an external electronic device 102 and 104. Examples of the information exchange application may include, but are not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic devices 102 and 104. Further, the notification relay application may receive notification information from, e.g., the external electronic device and may provide the received notification information to the user. A device management application may perform at least some functions of the external electronic device 102 or 104 such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device 102 and 104. The application 370 may include an application received from the server 106 or electronic devices 102 and 104. The application 370 may include a preloaded application or a third party application downloadable from a server. The names of the components of the program module 310 may be vary depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, and the like for performing one or more functions.

Figure 4:
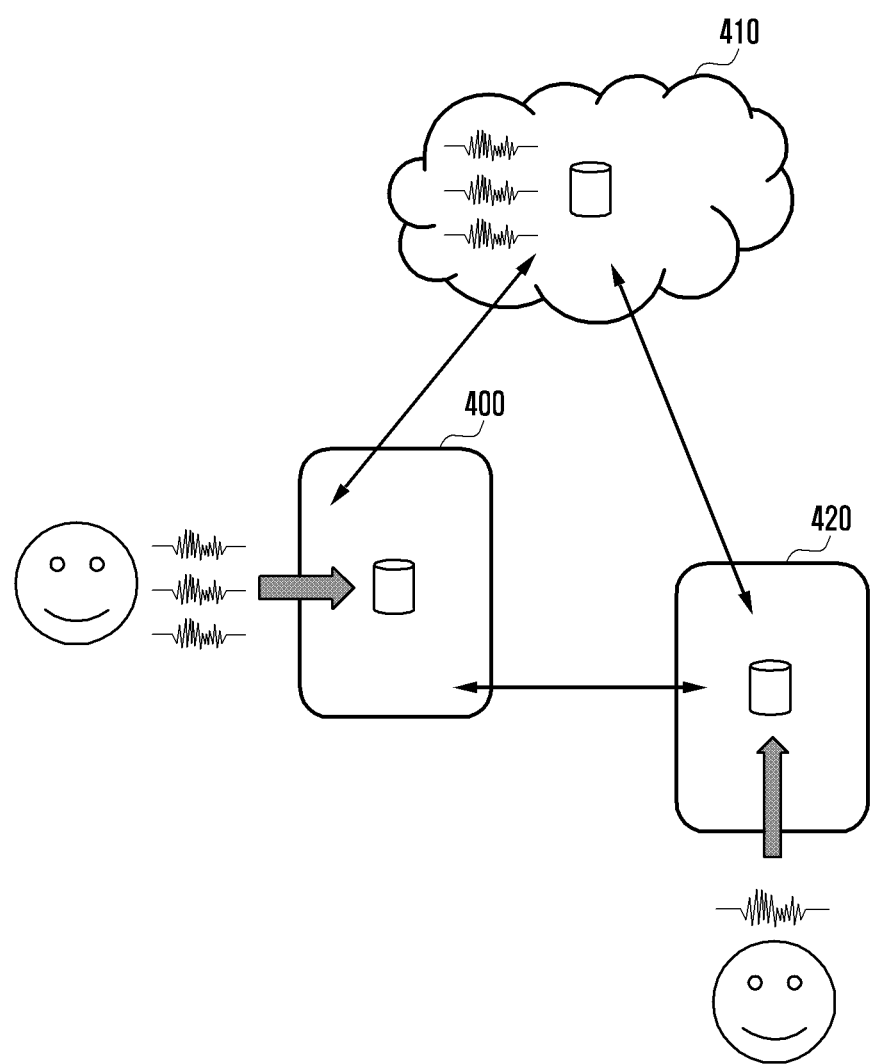
FIG. 4 is a diagram illustrating a communication connection between electronic devices and a server, according to an embodiment of the present disclosure.

FIG. 4 is a diagram illustrating a communication connection between electronic devices 400 and 420 and a server 410 according to an embodiment of the present disclosure.

The electronic devices 400 and 420, may transmit and receive data to and from the server 410. The first electronic device 400 may receive and store a voice activating a voice recognition related application. For example, the first electronic device 400 may receive and store specific words, constructions, sentences, and the like, which activate the voice recognition application, from a user. In addition, for example, the first electronic device 400 may store a voice recognition model of a voice signal received from the user on the basis of a pre-stored algorithm (for example, noise cancellation algorithm, error rate reduction algorithm, and the like). The first electronic device 400 may transmit voice recognition and voice recognition model related data to the server 410 and a second electronic device 420.

The electronic device 400 may include at least one microphone, a communication circuit, and a processor electrically connected to at least one microphone and the communication circuit. The electronic device 400 according to an embodiment of the present disclosure may include a memory that is electrically connected to the processor.

The memory, according to an embodiment of the present disclosure may, store at least one application program that may be triggered in response to a voice input or a software program executing a selected voice instruction.

The memory may store instructions to allow the processor to sequentially receive a plurality of utterances including a first speech element from the first user through at least one microphone. Here, the plurality of utterances including the first speech element may include frequency information over time in voice data. For example, the plurality of utterances may mean that the user outputs voice.

The processor, according to an embodiment of the present disclosure, may store instructions generating the voice recognition model of the first user in the memory on the basis of at least some of the plurality of utterances.

The processor may store the instructions storing the generated voice recognition model in the memory. The processor may store instructions transmitted to the outside (for example, server device, another electronic device, and the like) through the communication circuit. The processor may transmit the voice recognition model, the plurality of utterances (for example, user voice related data, and the like), environment information (for example, noise information, voice related data simultaneously received upon the utterance recognition, and the like), and hardware information (for example, microphone characteristics, and the like) to the outside.

The processor may store the instructions storing the plurality of received utterances. The processor may transmit data or signals including or representing at least some of the plurality of stored utterances to the outside through the communication circuit.

The processor may transmit the generated voice recognition model of the first user to the server 410, which may communicate with the first electronic device, through the communication circuit.

The processor may store the instructions for receiving, after generating the voice recognition model of the first user, the utterances including the first speech element through the microphone in the memory.

The processor may use the voice recognition model of the first user to store the instructions performing the voice recognition on the received utterances in the memory.

The processor may store the instructions executing the at least one application program or the software program on the basis of the result of the voice recognition.

The voice recognition model may be associated with at least one of a hidden Markov model (HMM) and an artificial neural network (ANN).

The voice recognition model may include at least one of characteristics information (for example, microphone specification related information, and the like) of the microphone or environment information (for example, noise information, and the like) surrounding the electronic device when the utterances of the first user are received through the microphone. Here, the microphone specification related information may be microphone frequency information, sensitivity, impedance, a polar pattern, and the like.

The memory, according to an embodiment of the present disclosure, may store instructions to allow the processor to calculate an error rate occurring when the at least one application program or the software program is triggered on the basis of at least some of the parameters generated and at least one of the plurality of utterances. For example, the processor may change at least one parameter when the calculated error rate is equal to or greater than a threshold value and may associate at least one parameter with the voice signal when the calculated error rate is less than the threshold value.

The change in parameters depending on the error rate according to an embodiment of the present disclosure may also be replaced by the change in parameters depending on likelihood by another algorithm. For example, the processor according to an embodiment of the present disclosure may change at least one parameter when the calculated likelihood is equal to or greater than the threshold value and may associate at least one parameter when the calculated error rate exceeds the threshold value.

Associating, by the processor, at least one parameter with the voice signal may confirm or determine the voice recognition model associated with the utterances received from the microphone.

When receiving the plurality of utterances, the may analyze voice data for the plurality of utterances to calculate an average, a variance, and the like thereof. For example, the processor may calculate model parameters (for example, probability density function) on the basis of the calculated data. The processor may calculate likelihoods for the plurality of utterance related parameters (for example, mel frequency cepstal coefficients (MFCC), perceptual linear prediction (PLP), voice related data, and the like) to the calculated model parameters. The processor may change the model parameters when the calculated likelihood is equal to or less than a preset threshold value. The processor may determine the corresponding model parameter as the voice recognition model for voice recognition when the calculated likelihood is greater than or equal to the preset threshold value.

The processor may calculate the error rate on the basis of at least one changed parameter when the calculated error rate is greater than or equal to the threshold value.

The processor may repeat the change in at least one parameter and the calculation of the error rate when the calculated error rate is equal to or greater than the threshold value. Technical features associated with the error rate may be replaced by the foregoing likelihood algorithm.

The processor may count the repetition number of the change in at least one parameter and the prediction of the error rate. The processor may associate the at least one changed parameter with the voice signal upon repeating as many as the selected frequency, when the counted repetition frequency reaches the selected frequency.

The server 410 may receive the voice signal and the voice recognition model from the first electronic device 400. The server 410 may receive a data request signal related to the voice signal from the second electronic device 420. The server 410 may transmit the voice signal and the voice recognition model received from the first electronic device 400 to the second electronic device 420, as a response to the received data request signal.

The server 410 may determine whether a user account of the first electronic device 400 matches a user account of the second electronic device 420. For example, the server 410 may transmit the voice signal and the voice recognition related data as a response to the request signal received from the second electronic device 420 to the second electronic device 420 when ID information corresponding to the first electronic device 400 is substantially the same as ID information of the second electronic device 420.

The server 410 may include the communication circuit. The server 410 may include the processor electrically connected to the communication circuit. The server 410 may include the memory that is electrically connected to the processor. The processor may receive the voice signal that may trigger the at least one application program or the software program executing the selected voice instructions from the first external device (for example, first electronic device 400) through the communication circuit. The server 410 may receive the environment information (for example, surrounding noise information, and the like) surrounding the first external device (for example, first electronic device 400) or hardware information (for example, characteristics of the microphone receiving voice from the first electronic device, and the like). The server 410 may use the communication circuit to receive the request for the voice signal or the voice recognition model from the second external device (for example, second electronic device 420) that is connected to the first external device (for example, first electronic device 400) or has substantially the same user account. The server 410 may use the communication circuit to store instructions to the voice signal or the voice recognition model to the second external device (for example, second electronic device 420) in response to the received request.

The server 410 may divide the devices on the basis of the ID information corresponding to the electronic devices.

The server 410 may include the communication circuit that may communicate with the first electronic device 400 including a first microphone and the second electronic device 420 including a second microphone. The server 410 may include the processor electrically connected to the communication circuit. The server 410 may include the memory that is electrically connected to the processor.

The processor of the server 410 may receive the voice recognition model of the first user through the communication circuit. For example, the processor of the server 410 may receive the voice recognition model, which is generated by sequentially receiving the plurality of utterances including the first speech element received from the first user through the first microphone of the first electronic device 400, from the first electronic device 400 through the communication circuit.

The server 410 may store the received voice recognition model of the first user in the memory. The sever 410 may receive the transmission request of the voice recognition model of the first user from the second electronic device 420 through the communication circuit.

The server 410 may store instructions to transmit the generated voice recognition model of the first user to the second electronic device 420 through the communication circuit in response to the received request. For example, the server 410 may transmit the voice recognition model to the second electronic device 420 so that the second electronic device 420 uses the generated voice recognition model of the first user when performing the voice recognition on utterances including the first speech element of the first user.

The voice recognition model according to an embodiment of the present disclosure may be associated with at least one of a hidden Markov model (HMM) and the artificial neural network (ANN).

When receiving the utterances of the first user through the first microphone, the voice recognition model may further include at least one of the characteristics information of the first microphone and the environment information surrounding the first electronic device 400. The second electronic device 420 may receive the voice signal and the voice recognition model from the first electronic device 400 or the server 410. The second electronic device 2 may receive the environment information (for example, surrounding noise information, and the like) surrounding the first external device (for example, first electronic device 400) or hardware information (for example, characteristics of the microphone receiving voice from the first electronic device, and the like). The first electronic device 400 and the second electronic device 420 may transmit and receive data (for example, voice signal related data, voice recognition model related data, and the like) using a wireless protocol or a wired protocol. For example, the first electronic device 400 and the second electronic device 420 may transmit and receive the data (for example, voice signal related data, voice recognition model related data, and the like) using short range wireless communication (for example, Bluetooth, and the like).

The second electronic device 420, according to an embodiment of the present disclosure, may transmit a signal requesting the voice related data to the server 410. The second electronic device 420 may receive the voice signal and the voice recognition model related data, which are received from the first electronic device, from the server 410. The second electronic device 420 may receive the environment information (for example, surrounding noise information, and the like) surrounding the first external device (for example, first electronic device 400) or hardware information (for example, characteristics of the microphone receiving voice from the first electronic device, and the like).

The second electronic device 420 may include the communication circuit. The second electronic device 420 may include at least one microphone. The second electronic device 420 may include the processor that is electrically connected to the communication circuit and at least one microphone.

The second electronic device 420 may include the memory that is electrically connected to the processor. The memory may store the at least one application program or the software program executing the selected voice instruction that may be triggered in response to the voice input.

The second electronic device 420 may receive the voice signal using at least one microphone. The second electronic device 420 may activate the voice recognition application as it receives the voice signal through the microphone, on the basis of the voice recognition model received from the first electronic device 400 or the server 410.

The second electronic device 420 may generate the second voice recognition model on the basis of at least one of the voice recognition model, the voice signal, the hardware information (for example, characteristics of the microphone of the first electronic device 400), and the environment information (for example, noise data, and the like) of the first electronic device 400 that are received from the first electronic device 400 or the server 410.

The second electronic device 420, may compare the first voice recognition model received from the outside with the utterances (for example, user voice, and the like) received through at least one microphone. The second electronic device 420 may remove the noise data from the utterances received through at least microphone and compare the utterances with the first voice recognition model. For example, the second electronic device 420 may confirm a signal to noise ratio (SNR) to determine the noise data, before the utterances are received through the microphone. The second electronic device 420 may remove the determined noise data.

The second electronic device 420 may change the determined voice recognition model when the calculated error rate is equal to or greater than the threshold value. The second electronic device 420 may determine the voice recognition model of the second electronic device 420 when the calculated error rate is less than the threshold value. The change in parameters depending on the error rate according to an embodiment of the present disclosure may also be replaced by the change in parameters depending on likelihood by another algorithm. For example, the processor according to an embodiment of the present disclosure may change at least one parameter when the calculated likelihood is equal to or greater than the threshold value and may associate at least one parameter when the calculated error rate exceeds the threshold value.

When adaptively performing the voice recognition model, the second electronic device 420 may transmit update information to the server 410.

The functions of the first electronic device 400 and the server 410 may be implemented in one device (for example, electronic device, robot, and the like). The additional functions of the server 410 and the second electronic device 420 may be also implemented in one device.

The electronic device 420 may include the communication circuit, at least one microphone, and the processor electrically connected to the communication circuit and at least one microphone. The electronic device may include the memory electrically connected to the processor.

The memory of the second electronic device 420 present disclosure, may store the at least one application program or the software program executing the selected voice instruction that may be triggered in response to the voice input.

The processor of the second electronic device 420 may transmit and receive the signal requesting the voice recognition model to the external device (for example, first electronic device 400 and server 420). For example, the second electronic device 420 may transmit the signal requesting the voice recognition model of the first user generated by sequentially receiving, by the first electronic device 400, the plurality of utterances including the first speech element to the external devices (for example, first electronic device 400, server 420, and the like) through the communication circuit.

The second electronic device 420 may receive the voice recognition model of the first user provided as the response to the request through the communication circuit.

The second electronic device 420 may store the received voice recognition model of the first user in the memory.

The second electronic device 420 may receive the utterances including the first speech element of the first user through at least one microphone. The second electronic device 420 may receive the same user's utterances as the user's utterances used to generate the voice recognition model through the microphone.

The second electronic device 420 may store instructions to perform the voice recognition for the received utterance, on the basis of at least some of the stored voice recognition model of the first user.

The second electronic device 420 may change at least some of the received voice recognition model of the first user on the basis of at least some of the utterances including the first speech element of the first user received through at least one microphone.

The processor may receive the utterances including the first speech element of the first user through at least one microphone after at least some of the received voice recognition model of the first user is changed. The voice recognition for the received utterances may be performed on the basis of at least some of the voice recognition model of the first user that is at least partially changed.

The voice recognition model, according to an embodiment of the present disclosure, may be associated with at least one of a hidden Markov model (HMM) and an artificial neural network (ANN).

When receiving the utterances of the first user through the microphone, the voice recognition model may further include at least one of the characteristics information of the microphone and the environment information surrounding the electronic device.

Figure 5:
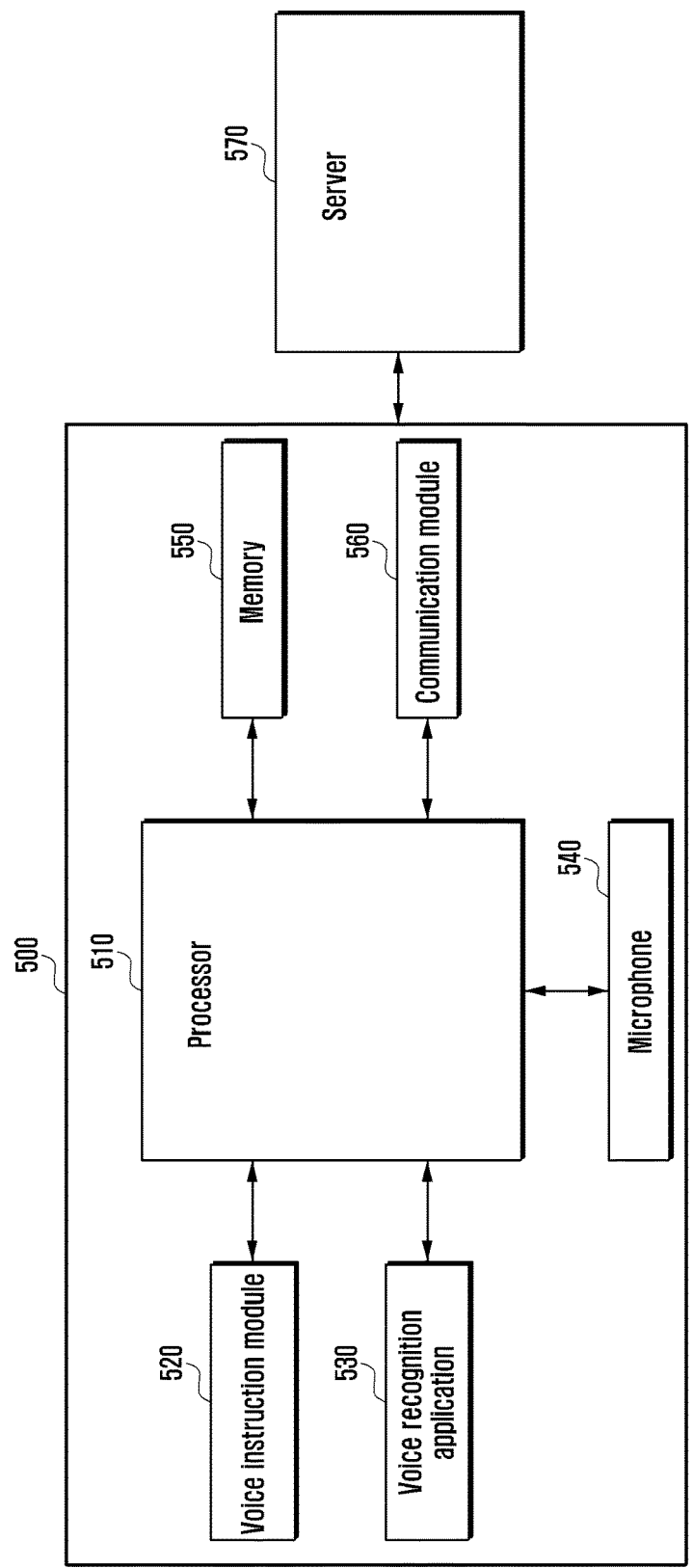
FIG. 5 is a diagram illustrating the communication connection between the electronic device and the server, according to an embodiment of the present disclosure.

FIG. 5 is a diagram illustrating the communication connection between the electronic device and the server, according to an embodiment of the present disclosure.

An electronic device 500 may transmit and receive data to and from a server 570. The electronic device 500 includes a processor 510, a voice instruction module 520, a voice recognition application 530, a microphone 540, a memory 550, and a communication module 560.

The processor 510, according to an embodiment of the present disclosure, may receive a voice signal activating the voice recognition application 530 from the microphone 540. When receiving the voice signal from the microphone 540, the processor 510 may convert the received voice signal into data that may be processed by an audio codec. For example, the processor 510 may receive specific words, constructions, sentences, and the like, which may activate the voice recognition application 530, from a user through the microphone 540.

The processor 510, according to an embodiment of the present disclosure, may compare the voice recognition model stored in the memory 550 with the received voice to determine whether to activate the voice recognition application 530. For example, the processor 510 may receive words, constructions, sentences, and the like associated with the performance of the specific application, from a user through the microphone 540.

The processor 540 may execute a specific application (for example, web site application, SNS application, and the like) by the voice recognition of the voice instruction module 520. The processor 540 may transmit the voice instruction related data to the server 570 through the communication module 560 when executing the specific application by the voice recognition of the voice instruction module 520. The processor 540 may receive data associated with the execution of the specific application from the server 570 through the communication module 560.

Figure 6:
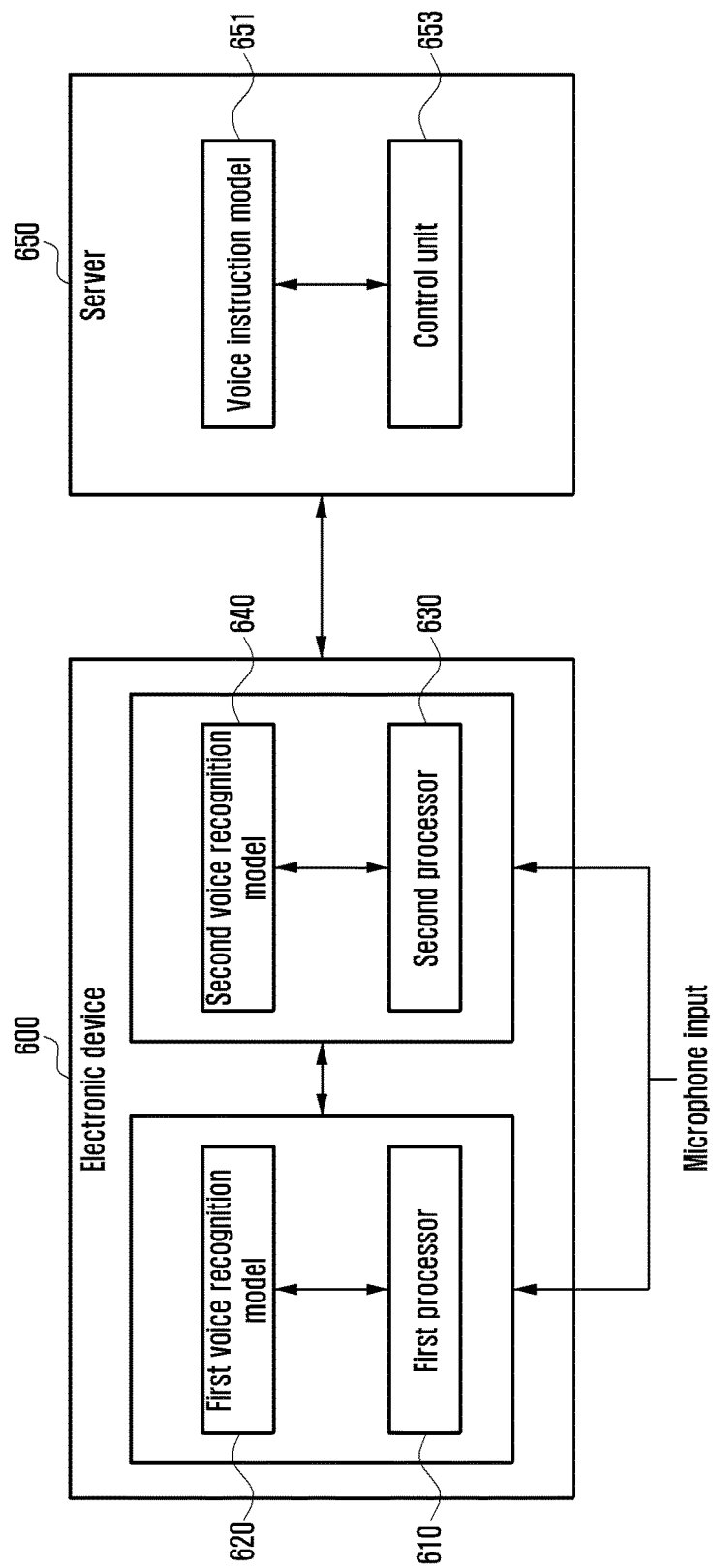
FIG. 6 is another diagram illustrating the communication connection between the electronic device and the server, according to an embodiment of the present disclosure.

FIG. 6 is a diagram illustrating the communication connection between the electronic device and the server, according to an embodiment of the present disclosure.

An electronic device 600 may transmit and receive data associated with a voice instruction to and from a server 650. The electronic device 600 may include a first processor 610, a first voice recognition model 620, a second processor 630, and a second voice recognition model 640. The server 650 may include a voice instruction model 651 and a control unit 653.

The electronic device 600 may include a plurality of processors. The electronic device 600 may include a low power processor (for example, sub processor) and a main processor (for example, application processor (AP)). for example, for example, The electronic device 600, according to an embodiment of the present disclosure, may generate a voice recognition model differently based on the kind of processor (for example, sub processor, main processor, and the like).

The electronic device 600 may determine the voice recognition model based on the model parameters that are generated on the basis of the plurality of utterances. When determining the voice recognition model, the electronic device 600 may change the model parameter differently depending on the processor (for example, algorithm repetition frequency, set threshold values, set likelihoods of model parameter, and the like). For example, when determining the voice recognition model on the basis of the model parameter, the main processor may set the algorithm repetition frequency to be higher than that of the sub processor.

When receiving the voice signal through the microphone, the electronic device 600, according to an embodiment of the present disclosure, may perform preprocessing. The electronic device 600 may generate the voice recognition model by the first processor 610 (for example, low power processor). The first processor 610 may determine whether to activate the received voice recognition application on the basis of the pre-stored first voice recognition model. The first processor 610 may transfer data on whether to activate the voice recognition application to the second processor 630 (for example, application processor (AP)).

The second processor 630 (for example, AP), according to an embodiment of the present disclosure, may receive voice recognition related data from the first processor 610. The second processor 630 may determine whether to activate the voice recognition application on the basis of a pre-stored second voice recognition model 640 or the voice recognition related data received from the first processor 610.

The first processor 610 or the second processor 630 may activate the voice recognition application and then may activate the voice instruction module activating a specific application (for example, SNS application, web site application).

The first processor 610 or the second processor 630 may transmit the activation related data of the voice instruction module to the server 650. The server 650 may receive the activation related data of the voice instruction module from the electronic device 600. The control unit 653 of the server 650 may extract voice instructions corresponding to the received activation related data of the voice instruction module on the basis of the pre-stored voice instruction model 651. For example, when receiving the voice related data of specific words (for example, text message, memo, and the like) from the electronic device 600, the server 650 may confirm the related application to be executed on the basis of the pre-stored voice instruction model 651. The server 650 may transmit the confirmed application to the electronic device 600.

The electronic device 600 may execute a specific application corresponding to the voice instruction by the first processor 610 or the second processor 630. The electronic device 600 may execute the specific application corresponding to the voice instruction on the basis of the data associated with the execution of the specific application received from the server 650.

Figure 7:
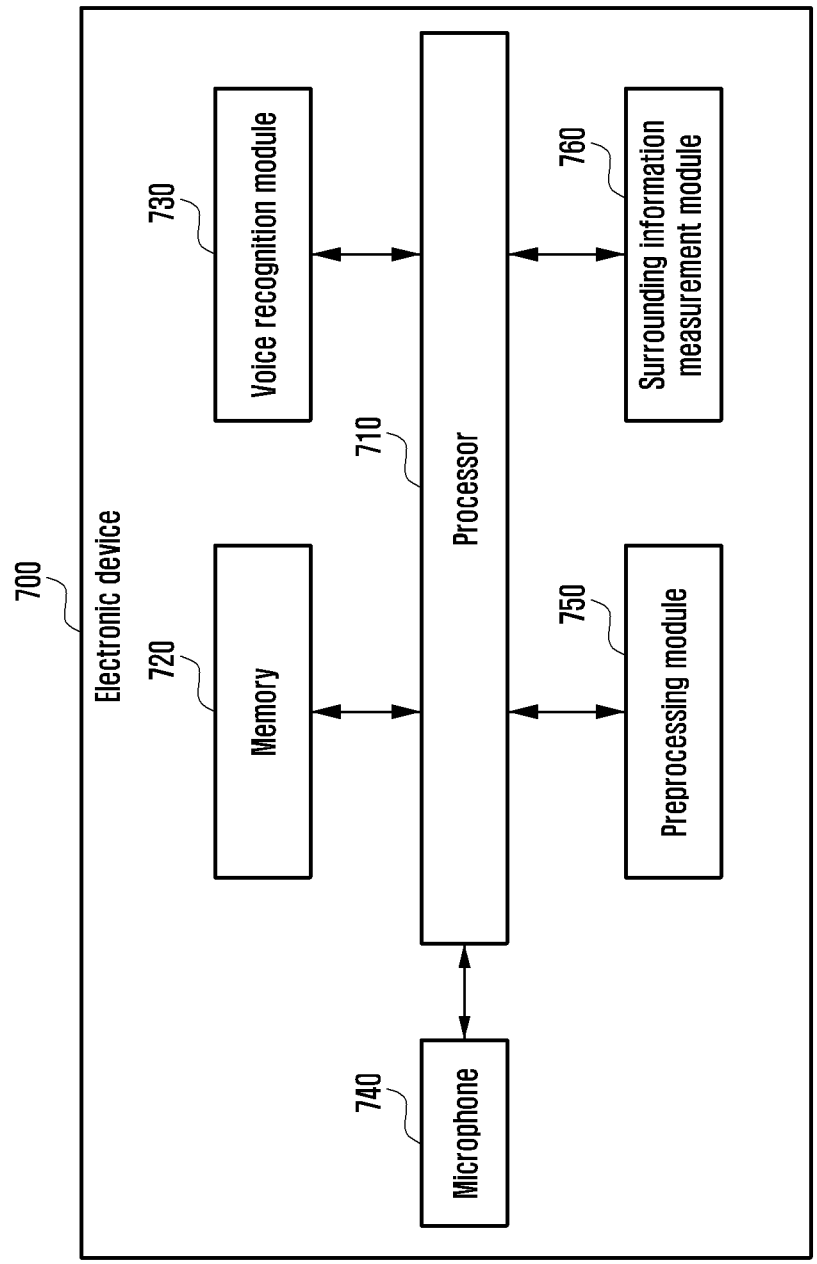
FIG. 7 is another block diagram of an electronic device, according to an embodiment of the present disclosure.

FIG. 7 is a block diagram of another electronic device, according to an embodiment of the present disclosure.

An electronic device includes a processor 710, a memory 720, a voice recognition module 730, a microphone 740, a preprocessing module 750, a surrounding information measurement module 760.

The electronic device 700 may include at least one microphone 740. The electronic device 700 may include the processor 710 electrically connected to at least one microphone 740. The electronic device 700 may include a memory 720 electrically connected to the processor 710.

The memory 720 may store the at least one application program or the software program executing the selected voice instruction that may be triggered in response to the voice input. For example, the memory 720 may store the voice recognition application or the software program executing the voice instruction module in response to the voice input.

The processor 710 may use at least one microphone 740 to receive the voice signal. The processor 710 may receive the voice signal activating the voice recognition application through the microphone 740. For example, the processor 710 may receive words, constructions, sentences, and the like for activating the voice recognition application through the microphone 740. The memory 720 may store instructions to process the received voice signal. The preprocessing module 750 according to an embodiment of the present disclosure may convert the received voice signal into a form of data that may be processed.

The processor 710 may determine at least one parameter associated with situation information surrounding at least one microphone 740, the processor 710, the memory 720, and the electronic device 700 or a speaker of the voice signal. The processor 710 may determine an algorithm for processing the received voice signal on the basis of a clock speed, a cache size, the memory 720, and the like. For example, when processing the received voice signal, the processor 710 may select a fast algorithm from a plurality of algorithms (for example, noise removal algorithm, iterative processing algorithm, and the like) in the case of a large cache size.

The processor 710 may acquire the situation information surrounding the electronic device 700 by a surrounding information measurement module 760. For example, the surrounding information measurement module 760 may confirm noise data through the microphone 740. The processor 710 may determine the parameters associated with the speaker of the voice signal on the basis of waveform information of the voice signal, pitch information, frequency information over time, and the like.

The processor 710 may receive the voice signal several times (for example, three and four times) through at least one microphone 740. The voice recognition module 730 may determine the voice recognition model corresponding to the voice for activating the voice recognition application on the basis of the noise related data included in the received voice signal.

The memory 720, according to an embodiment of the present disclosure, may store instructions to transmit the voice signal and at least one parameter associated therewith to the external device.

The instructions allow the processor 710 to calculate the error rate occurring when the received voice signal triggers the at least one application program or the software program on the basis of at least some of the determined parameters. For example, the processor 710 may calculate the error rate occurring upon the speech recognition application on the basis of at least one parameter (for example, noise related parameter, and the like).

The voice recognition module 730 may change at least one of the determined parameters when the calculated error rate is equal to or greater than the threshold value. The threshold value may be a reference error threshold value corresponding to the voice recognition that may activate the voice recognition application through the microphone 740.

The electronic device 700 may receive the voice for activating the voice recognition application by the microphone 740 several times (for example, three and four times). The processor 710 may process the data on the voice recognition by the preprocessing module 750 and confirm whether the processed data has a value from 0 to 1. For example, the processor 700 may confirm that the voice for activating the voice recognition application is recognized, when the processed data has a reference value of 0.7 or greater. The processor 700 may set the value corresponding to the confirmed voice to be the threshold reference value to determine the threshold error rate value corresponding to the threshold reference value. As an additional example, the processed data having a value from 0 to 1 may be determined on the basis of the noise data, the voice data, and the like, received through the surrounding information measurement module 760.

The memory 720 may store instructions to associate at least one determined parameter with the voice signal when the calculated error rate is less than the threshold value. The processor 710 may determine voice signal modeling for performing the voice recognition application when the voice signal including specific words, constructions, or sentences, and the like is less than the set threshold value. The memory 720 may store the confirmed voice recognition model.

The instructions may be instructions to allow the processor 710 to trigger at least one application program or the software program, on the basis of at least one changed parameter and the received voice signal.

The instructions may be instructions to allow the processor 710 to calculate the error rate on the basis of at least one changed parameter when the calculated error rate is equal to or greater than the threshold value.

The instructions may be instructions to allow the processor 710 to repeat the change in at least one parameter and the calculation of the error rate until the calculated error rate is less than the threshold value, when the calculated error rate is equal to or greater than the threshold value.

The instructions may be instructions to allow the processor 710 to count the repetition frequency of the change in at least one parameter and the prediction of the error rate, and associate at least one changed parameter with the voice signal upon repeating as many as the selected frequency, when the counted repetition frequency reaches the selected frequency, which may be stored in the memory 720.

Figure 8:
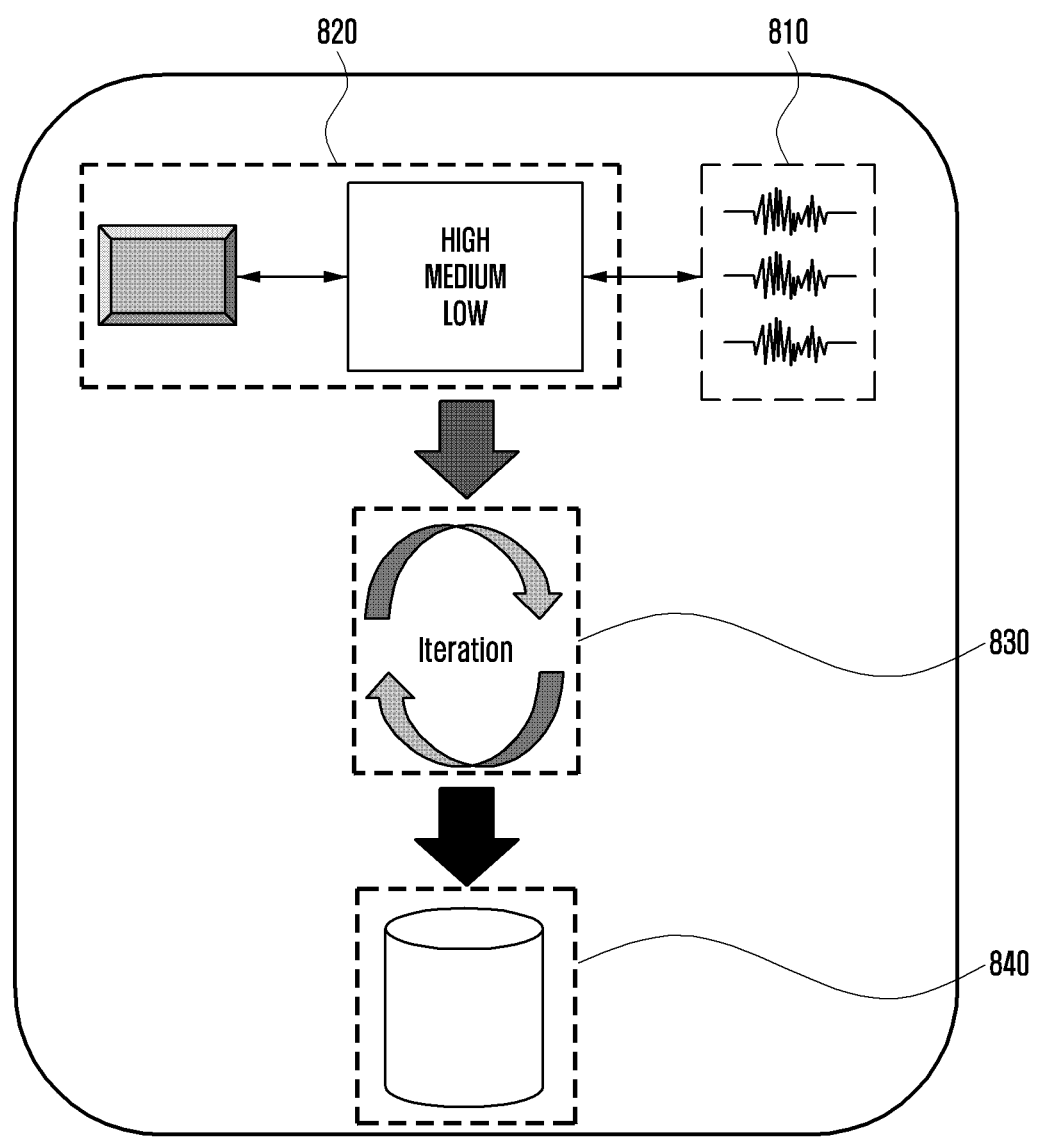
FIG. 8 is a diagram illustrating the voice recognition model of the electronic device, according to an embodiment of the present disclosure.

FIG. 8 is a diagram illustrating the voice recognition model of the electronic device, according to an embodiment of the present disclosure.

An electronic device 101 may recognize the voice by the microphone. Referring to reference numeral 810, the electronic device 101 may recognize the voice (for example, utterance, and the like) by the microphone.

Referring to reference numeral 820, the electronic device 101 may set the algorithm for processing the recognized voice on the basis of the cache size, the memory, the kind of processors, and the like. For example, the electronic device 101 may select any one of high speed processing, medium speed processing, or low speed processing algorithm. The electronic device 101 may receive an audio signal associated with the surrounding environmental noise and parameters corresponding to the related audio data. The electronic device 101 may make the complexities of the algorithm different on the basis of a computation in the same algorithm, select the algorithm itself, or simultaneously apply multiple algorithms.

Referring to reference numerals 830 and 840, the electronic device 101 may perform the voice recognition model for executing the voice recognition application on the basis of the voice signal and the parameters (for example, noise data related parameter, and the like). For example, the electronic device 101 may repeatedly change received data related to the voice recognition on the basis of the set threshold error rate until the set threshold error rate is less than the threshold error rate.

The electronic device 101 may transmit the voice recognition model to another electronic device.

Figure 9:
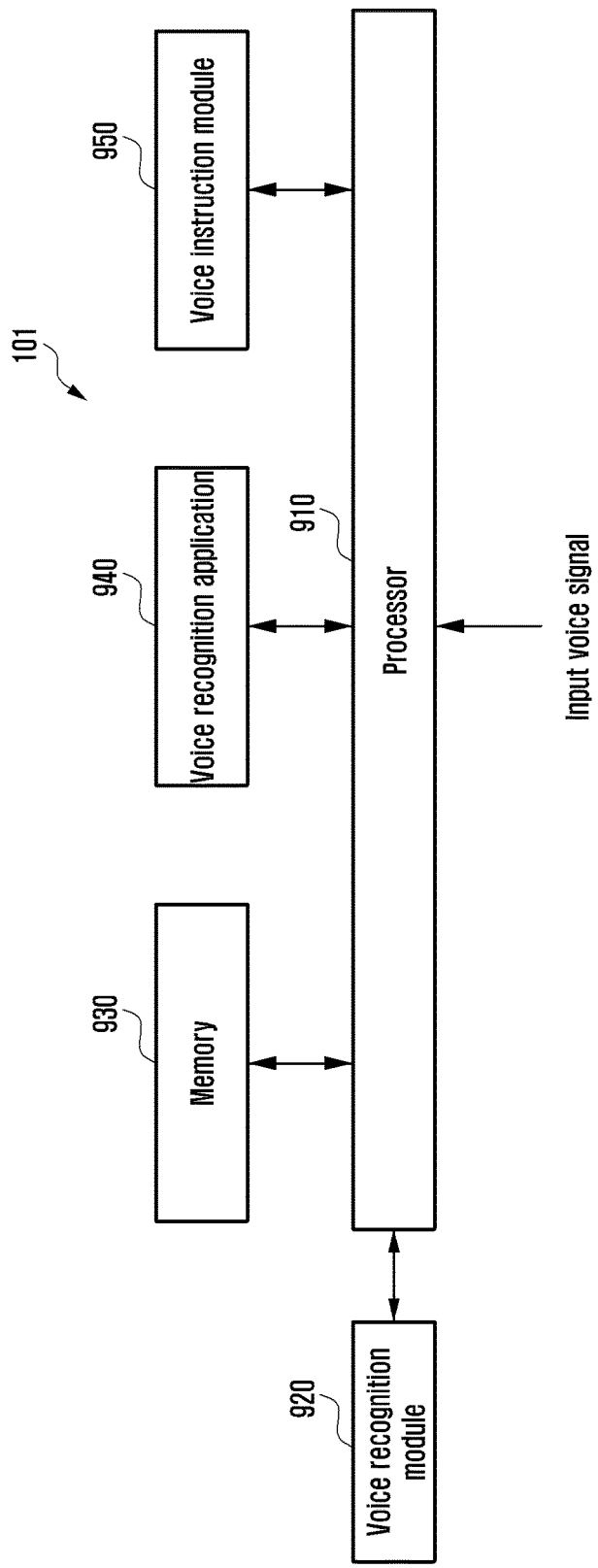
FIG. 9 is a voice recognition related block diagram of the electronic device, according to an embodiment of the present disclosure.

FIG. 9 is a voice recognition related block diagram of the electronic device, according to an embodiment of the present disclosure.

The electronic device 101 includes a processor 910, a voice recognition module 920, a memory 930, a voice recognition application 940, and a voice instruction module 950.

When receiving the voice signal from the microphone, the processor 910, according to an embodiment of the present disclosure, may confirm whether the voice activating the voice recognition application 940 is received. The voice recognition module 920 may perform the comparison with the voice signal received through the microphone on the basis of the voice recognition model pre-stored in the memory 930. When the voice recognition module 920 confirms that the voice signal received through the microphone is a signal for activating the voice recognition application 940, the voice recognition module 920 may transmit a voice recognition activation signal to the processor 910.

The processor 910 may receive the received voice recognition activation signal. The processor 910 may execute the voice recognition application 940 on the basis of the received voice recognition activation signal.

The processor 910 may execute the voice recognition application 940 and then receive the voice instruction signal through the microphone. The voice instruction module 950 may confirm a specific application to be executed on the basis of the received voice instruction signal. For example, when the user inputs the voice instruction signal called "start text message application", the voice instruction module 950 may transfer the instruction signal for execution of the text message application corresponding to the voice instruction signal to the processor 910. The processor 910 may execute the text message application on the basis of the instruction signal received from the voice instruction module 950.

The electronic device 101 include at least one microphone, the communication circuit, the processor electrically connected to at least one microphone and the communication circuit, and the memory 130 electrically connected to the processor 120.

The memory 130 may store the at least one application program or the software program executing the selected voice instruction that may be triggered in response to the voice input.

The processor 120 may sequentially receive the plurality of utterances including the first speech element from the first user through at least one microphone. According to an embodiment of the present disclosure, the voice recognition model of the first user is generated on the basis of at least some of the plurality of utterances, the generated voice recognition model is stored in the memory 130, and the instructions to transmit the generated voice recognition model of the first user to the outside, through the communication circuit, may be stored so that the first external device may use the generated voice recognition model of the first user, when performing the voice recognition on the utterances including the first speech element of the first user.

The instructions allow the processor 120 to store the plurality of received utterances in the memory and transmit the data or the signals including or representing at least some of the plurality of stored utterances to the outside through the communication circuit.

The instructions, according to an embodiment of the present disclosure, allow the processor 120 to transmit the generated voice recognition model of the first user to the server, which may communicate with the first electronic device, through the communication circuit.

The instructions allow the processor 120 to receive the utterances including the first speech element from the first user through the microphone after the voice recognition model of the first user is generated and to perform the voice recognition on the received utterances using the voice recognition model of the first user and execute the at least one application program or the software program on the basis of the result of the voice recognition.

The voice recognition model may be associated with at least one of a hidden Markov model (HMM) and an artificial neural network (ANN).

When receiving the utterances of the first user through the microphone, the voice recognition model, according to an embodiment of the present disclosure, may further include at least one of the characteristics information of the microphone and the environment information surrounding the electronic device.

The instructions allow the processor 120 to calculate the error rate occurring when the at least one application program or the software program is triggered on the basis of parameters generated on the basis of at least one of the plurality of utterances. When the calculated error rate is equal to or greater than the threshold value, the at least one parameter may be changed and when the calculated error rate is less than the threshold value, the at least one parameter may be associated with the voice signal.

The instructions allow the processor 120 to calculate the error rate on the basis of the at least one changed parameter when the calculated error rate is equal to or greater than the threshold value.

The instructions allow the processor 120 to repeat the change in at least one parameter and the calculation of the error rate until the calculated error rate is less than the threshold value, when the calculated error rate is equal to or greater than the threshold value.

The instructions allow the processor 120 to count the repetition frequency of the change in the at least one parameter and the prediction of the error rate and associate the at least one changed parameter with the voice signal upon the repetition as many as the selected frequency when the counted repetition frequency reaches the selected frequency.

The electronic device 101 may include a communication circuit that is configured to communicate with a first external electronic device including a first microphone and a second external electronic device including a second microphone, a processor 120 electrically connected to the communication circuit, and a memory 130 electrically connected to the processor.

The processor 120 may receive the voice recognition model of the first user generated by sequentially receiving the plurality of utterances including the first speech element, which are received from the first user through the first microphone of the first external electronic device from the first external electronic device, through the communication circuit.

The electronic device 101 may store the received voice recognition model of the first user in the memory 130 and receive the transmission request of the voice recognition model of the first user from the second external electronic device through the communication circuit.

The electronic device 101 may store instructions to transmit the generated voice recognition model of the first user to the second external electronic device through the communication circuit so that the second external electronic device may use the generated voice recognition model of the first user when performing the voice recognition on the utterances including the first speech element of the first user in response to the received request.

The voice recognition model may be associated with at least one of a hidden Markov model (HMM) and an artificial neural network (ANN).

When receiving the utterances of the first user through the first microphone, the voice recognition model, according to an embodiment of the present disclosure, may further include at least one of the characteristics information of the first microphone and the environment information surrounding the first external electronic device.

The electronic device 101 may include the communication circuit, at least one microphone, the processor 120 electrically connected to the communication circuit and at least one microphone, and the memory 130 electrically connected to the processor 120.

The memory 130 may store the at least one application program or the software program executing the selected voice instruction that may be triggered in response to the voice input. The processor 120 may transmit, by the first external electronic device including the first microphone, the signal requesting the voice recognition model of the first user generated by sequentially receiving the plurality of utterances including the first speech element from the first user, to the outside through the communication circuit.

The electronic device 101 may receive the voice recognition model of the first user provided as the response of the requesting signal through the communication circuit. The electronic device may store instructions to store the received voice recognition model of the first user in the memory 130, receive the utterances including the first speech element of the first user through at least one microphone, and perform the voice recognition on the received utterances on the basis of at least some of the stored voice recognition model of the first user.

The instructions allow the processor 120 to use at least some of the utterances including the first speech element of the first user received through at least one microphone to change at least some of the received voice recognition model of the first user The instructions allow the processor 120 to receive the utterances including the first speech element of the first user through at least one microphone after the received voice recognition model of the first user is at least partially changed and perform the voice recognition on the received utterances on the basis of at least some of the voice recognition model of the first user.

The voice recognition model may be associated with at least one of a hidden Markov model (HMM) and an artificial neural network (ANN).

When receiving the utterances of the first user through the microphone, the voice recognition model, according to an embodiment of the present disclosure, may further include at least one of the characteristics information of the microphone and the environment information surrounding the electronic device.

Figure 10:
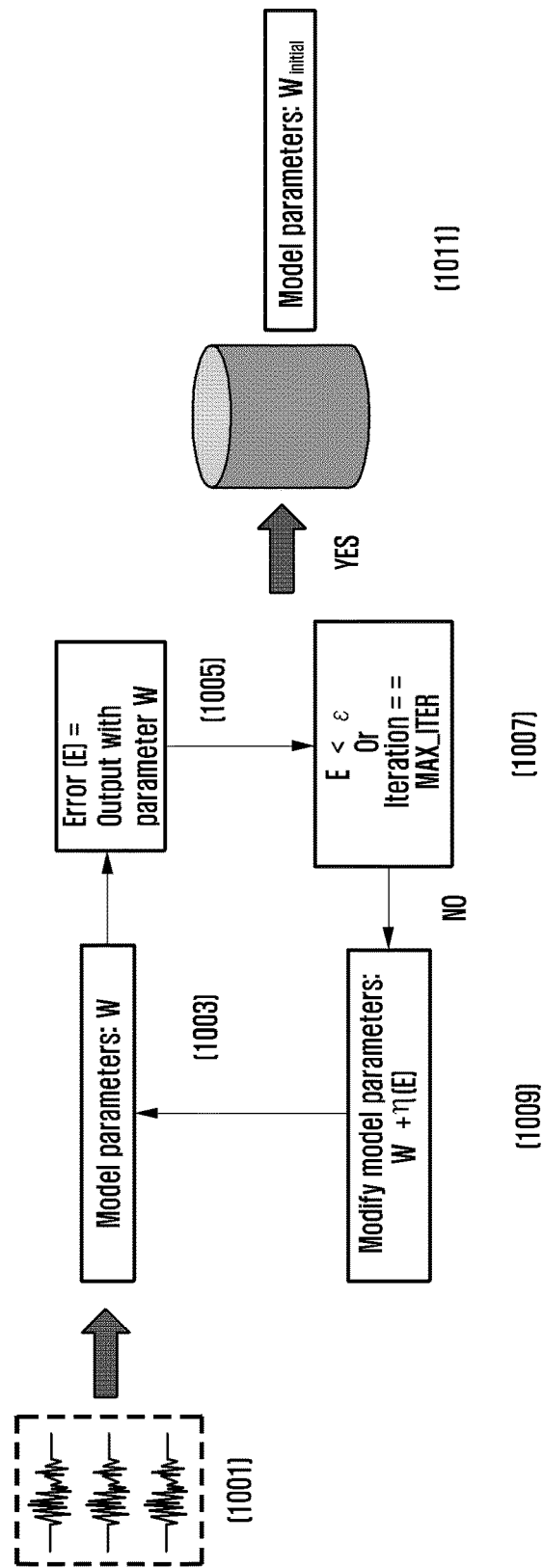
FIG. 10 is a diagram illustrating the voice recognition model of the electronic device, according to an embodiment of the present disclosure.

FIG. 10 is a diagram illustrating the voice recognition model of the electronic device, according to an embodiment of the present disclosure.

The electronic device 101 may perform the modeling on a specific voice for performing the voice recognition application from the user. Referring to reference numeral 1001, the electronic device 101 may receive the voice from the user. The electronic device 101 may receive specific words, constructions, sentences, and the like several times (for example, two to four times, and the like).

Referring to reference numeral 1003, the electronic device 101 may receive the model parameters. When receiving the plurality of utterances, the electronic device 101, according to an embodiment of the present disclosure, may analyze the voice data for the plurality of utterances to calculate an average, a variance, and the like thereof. For example, the processor may calculate model parameters (for example, probability density function) on the basis of the calculated data. The processor may calculate likelihoods for the plurality of utterance related parameters (for example, mel frequency cepstral coefficients (MFCC), perceptual linear prediction (PLP), voice related data, and the like) to the calculated model parameters.

The electronic device 101 may store the plurality of model parameters in the memory in advance and select any one of the plurality of model parameters.

Referring to reference numeral 1005, the electronic device 101 may calculate the error rate on the basis of the plurality of utterance related parameters to the calculated model parameters. The change in parameters depending on the error rate according to an embodiment of the present disclosure may also be replaced by the change in parameters depending on likelihood by another algorithm.

Referring to reference numeral 1007, the electronic device 101 may determine whether the calculated error rate is lower than the set threshold error rate. Alternatively, the electronic device 101 may determine whether the calculated likelihood is equal to or greater than the set likelihood.

Referring to reference numeral 1007, the electronic device 101, according to an embodiment of the present disclosure, may determine whether the voice recognition model is selected on the basis of the preset repetition frequency. For example, after repeating the steps in 1003 to 1009 five times, the electronic device 101 may select the voice recognition model corresponding to the repetition frequency of five times. When not reaching the preset repetition frequency, the electronic device 101 may change the model parameters.

The electronic device 101 may perform the voice recognition model of reference numeral 1011 when the calculated error rate is lower than the set threshold error rate.

The electronic device 101 may perform a control to change the model parameters of reference numeral 1009 when the calculated error rate is higher than the set threshold error rate.

The electronic device 101 may transmit the voice recognition model to another electronic device through short range wireless communication (for example, Wi-Fi, NFC, and the like). The electronic device 101 may store the voice recognition model and the voice recognition related data in a user account stored in the server.

Figure 11A:
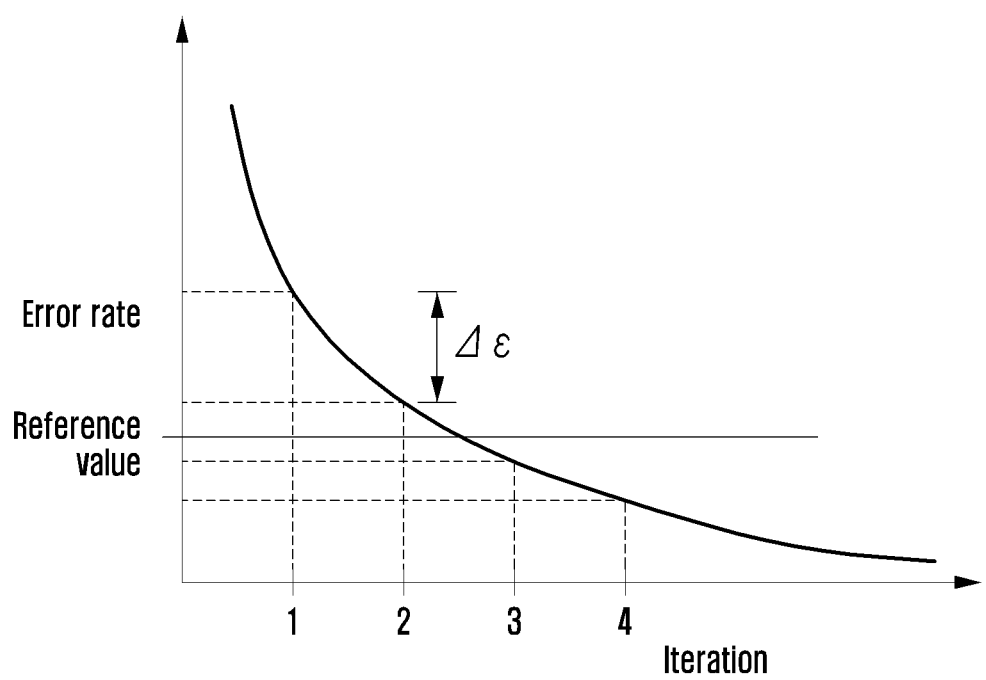
FIG. 11A is graph illustrating that the error rate is reduced in response to the repetition frequency of the parameters, according to an embodiment of the present disclosure.

FIG. 11A is a graph illustrating that the error rate is reduced in response to the repetition frequency of the parameters, according to an embodiment of the present disclosure.

Figure 11B:
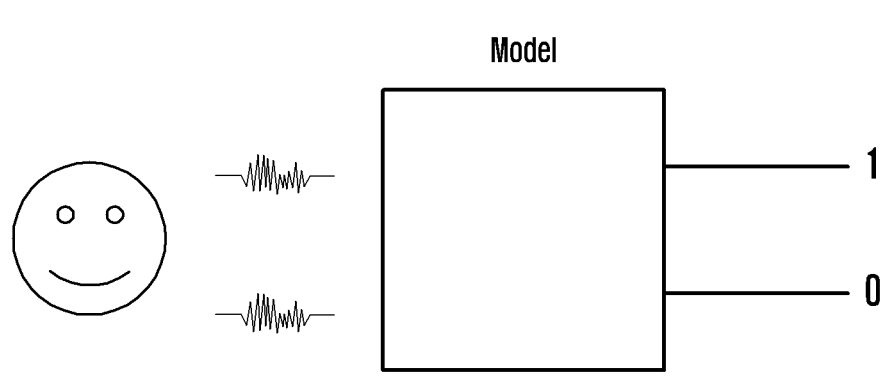
FIG. 11B is a diagram illustrating a model for confirming voice recognition, according to an embodiment of the present disclosure.

FIG. 11B is a diagram illustrating a model for confirming voice recognition, according to an embodiment of the present disclosure.

FIG. 11A is a graph illustrating that the error rate is reduced in response to the repetition frequency (number of iterations) of the parameters. The electronic device 101, according to an embodiment of the present disclosure may calculate at least one parameter (for example, noise related parameter, and the like) and the voice recognition. The electronic device 101 may perform a repetitive error rate reduction algorithm until the calculated error rate is equal to or less than the set error rate reference value.

FIG. 11B illustrates an example of setting the threshold error rate according to one embodiment of the present disclosure. The electronic device 101, according to an embodiment of the present disclosure, may receive the voice for executing the voice recognition application several times (for example, two to four times, and the like). The electronic device 101 may determine values between 0 to 1 as the determination value for whether the received voice signal may perform the voice recognition application.

For example, when the user inputs the specific words for performing the voice recognition application three times, the electronic device 101 may receive a voice indicating specific words. The specific words are not prescribed words, but may be selected and changed by the user of the electronic device 101.

The electronic device 101 may, for example, determine values corresponding to the specific words spoken three times by the user and activate the voice recognition application to calculate values of 0.84, 0.3, and 0.75, respectively. When the reference value for activating the voice recognition application is set to 0.7, the electronic device 101 may confirm the voice corresponding to the first data value (0.84) and the third data value (0.75). The electronic device 101 may set the voice recognition threshold value on the basis of the voice recognition data corresponding to the first data value and the voice recognition data corresponding to the third data value. The electronic device 101 may calculate the threshold error rate on the basis of the set voice recognition threshold value.

When the number of samples of the data values corresponding to the received utterances is small, the electronic device 101, according to an embodiment of the present disclosure, may output an alarm signal requesting a re-input to the user or display a graphic user interface on a screen. When the model parameters may not be calculated on the basis of the data values corresponding to the received utterances, the electronic device 101 may output the alarm signal requesting the re-input to the user or display the graphic user interface on the screen.

Figure 12:
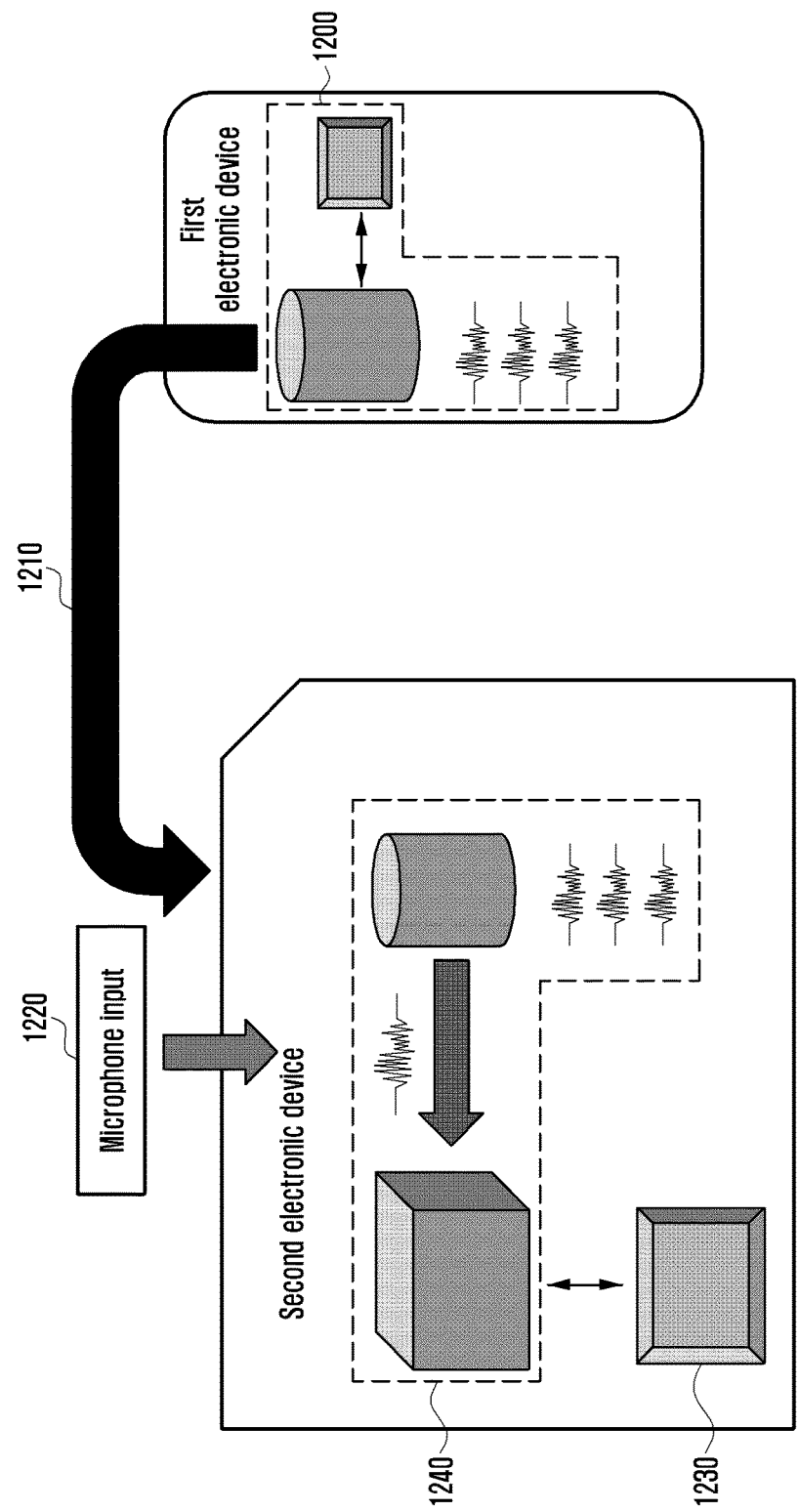
FIG. 12 is a diagram illustrating a transmission of voice recognition related data from a first electronic device to a second electronic device, according to an embodiment of the present disclosure.

FIG. 12 is a diagram illustrating a transmission of voice recognition related data from a first electronic device to a second electronic device, according to an embodiment of the present disclosure.

The first electronic device may receive the voice through the microphone. Referring to reference numeral 1200, the first electronic device may determine the voice recognition model on the basis of the received voice signal and the at least one parameter (for example, noise related data, and the like).

Referring to reference numeral 1210, the first electronic device may transmit the voice recognition model and the voice recognition related data (for example, voice data corresponding to the user's utterances of the first electronic device, characteristics information of the microphone, noise information, and the like) to the second electronic device. The first electronic device and the second electronic device may transmit and receive data through short range wireless communication (for example, Bluetooth, Wi-Fi, and the like), pairing, and the like. The second electronic device may receive the voice recognition model and the voice related data from the first electronic device or a server.

Referring to reference numeral 1230, the second electronic device, may receive the voice input through the microphone. The second electronic device may confirm audio noise data to be present along with the voice signal input. The second electronic device may remove (for example, filtering algorithm, and the like) the audio noise data from the received voice related data and audio noise data.

Referring to reference numeral 1240, the second electronic device, may compare the voice signal received from the second electronic device with the voice recognition model received from the first electronic device or the server. The second electronic device may determine whether to adaptively determine the voice recognition model on the basis of the error rate reference value included in the voice recognition model received by the voice related data.

When receiving the voice recognition for activating the voice recognition application through the microphone, the second electronic device, may activate the voice recognition application when it satisfies the preset threshold range value. For example, when the value corresponding to the voice recognition received through the microphone is between 0 and 1, the value between 0.3 and 1 may be determined as the preset threshold range value for activating the voice recognition application. The second electronic device may perform a control to deactivate the voice recognition application when a speaker is different, on the basis of the pre-stored voice recognition model information.

Figure 13:
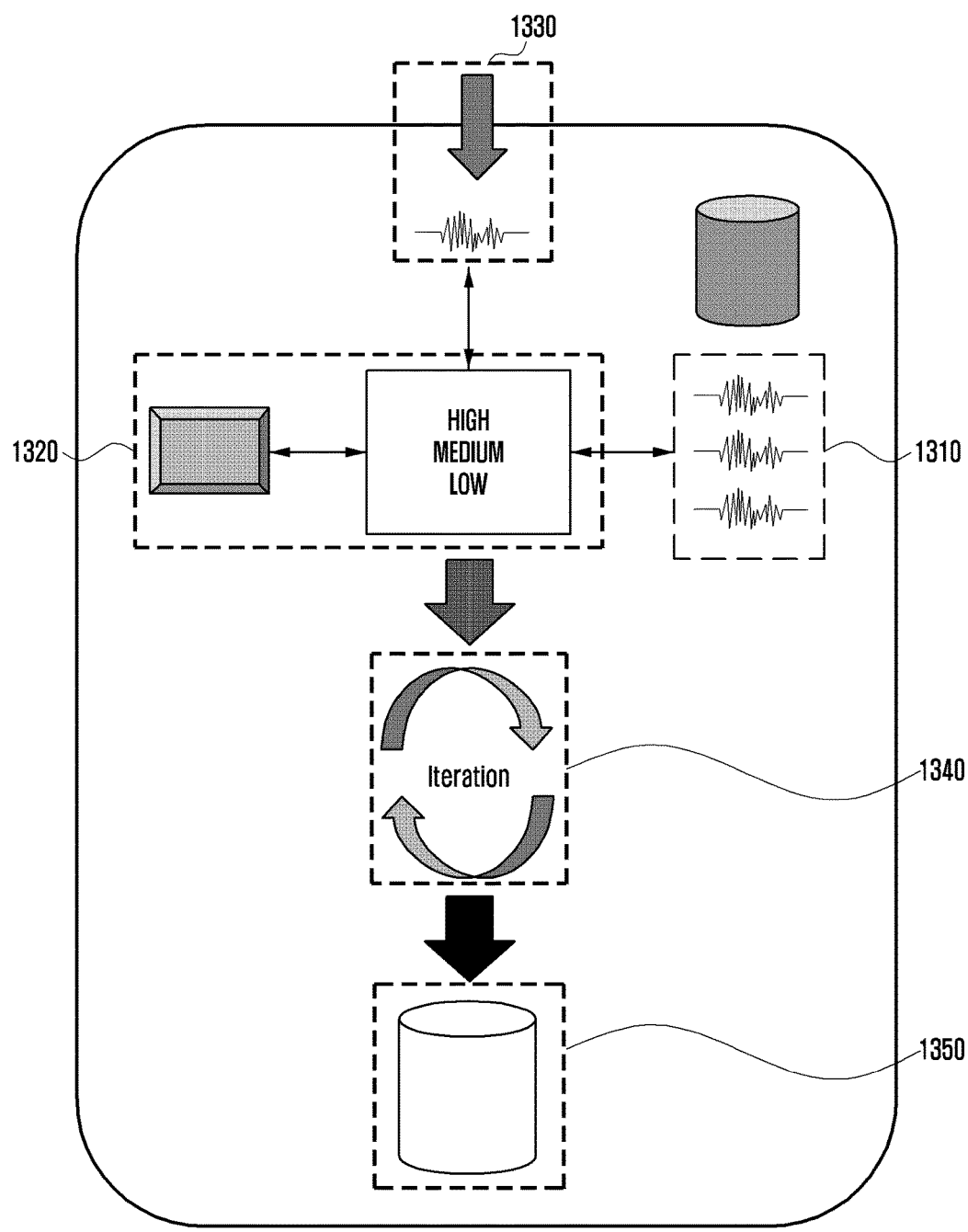
FIG. 13 is a diagram illustrating an adaptive voice recognition model of the electronic device, according to an embodiment of the present disclosure.

FIG. 13 is a diagram illustrating the adaptive voice recognition model of the electronic device, according to an embodiment of the present disclosure.

Referring to reference numeral 1310, the electronic device may receive and store the voice recognition model and the voice recognition related data (for example, user's utterance related voice data of the external device, noise information, characteristics information of the microphone, and the like) from the external device or the server.

Referring to reference numeral 1320, the electronic device, according to an embodiment of the present disclosure, may determine the algorithm (for example, noise removal algorithm, repetition frequency algorithm, and the like) for processing the received data on the basis of the kind of processors in the electronic device. The electronic device may confirm the audio data, and the like that are received from the surrounding environment in which the electronic device is located.

Referring to reference numeral 1330, the electronic device may receive the voice signal through the microphone. The electronic device, may remove (for example, filtered, and the like) the audio data (for example, noise data) received from the surrounding environment. The electronic may confirm the voice signal from which the noise related data are removed.

Referring to reference numeral 1340, the electronic device may determine whether the voice signal received through the microphone of the electronic device is less than the set threshold error rate on the basis of the voice recognition model information received from the outside. The electronic device, according to one embodiment of the present disclosure, may determine the adaptive voice recognition model of reference numeral 1350 when the received voice signal is less than the set threshold error rate. The electronic device may change at least some of the voice related data until the received voice signal is less than the threshold error rate when the received voice signal exceeds the set threshold error rate.

For example, the surrounding environment information of the voice recognition model received by another electronic device or the server may be an office environment and the voice signal received from the microphone of the electronic device may be in a surrounding environment of a subway. Since the surrounding environment related audio data generated from the office and the subway are different, the electronic device may remove the subway related noise data and then generate the adaptive voice recognition model.

The electronic device, may adaptively generate the voice recognition model on the basis of the characteristics of the microphone and the surrounding environment noise information.

The electronic device may update the adaptive voice recognition model to a cloud storage (remote storage) in which the voice recognition model of another electronic device is stored.

Figure 14:
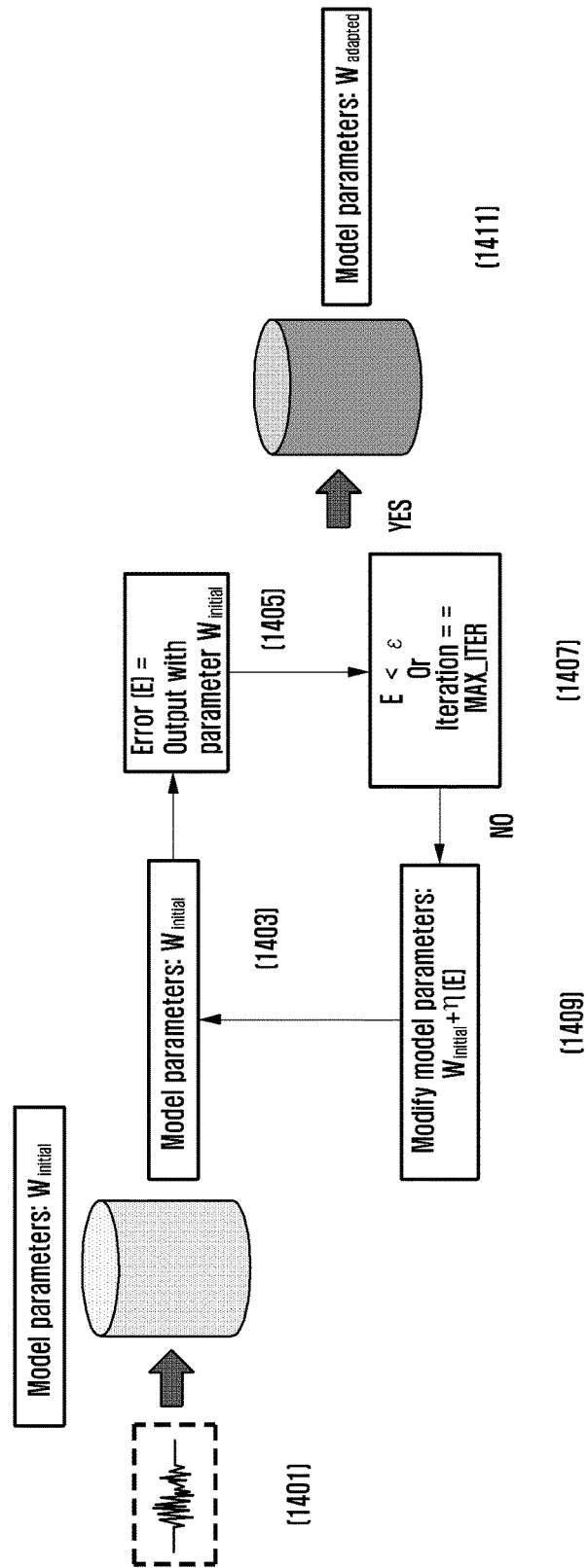
FIG. 14 is another diagram illustrating an adaptive voice recognition model of the electronic device, according to an embodiment of the present disclosure.

FIG. 14 is a diagram illustrating the adaptive voice recognition modeling of the electronic device, according to an embodiment of the present disclosure.

Referring to reference numeral 1401, the second electronic device 101 may receive the voice signal through the microphone. The electronic device may remove (for example, filter) the audio noise related data (for example, surrounding environment related audio data at which the electronic device 101 is located, and the like) among the received voice signals.

Referring to reference numeral 1403, the electronic device may receive the voice recognition model from the external devices (for example, another electronic device, server, and the like). The electronic device, according to an embodiment of the present disclosure, may set the voice recognition model to be Winital which is an initial model parameter. The electronic device may receive the utterance related parameters (for example, mel frequency cepstal coefficients (MFCC), perceptual linear prediction (PLP), feature vector, and the like) from the external device (for example, another electronic device, server, and the like). The electronic device may receive the information of the microphone receiving the utterances, the environment information (for example, noise information, and the like) upon the reception of the utterances, and the like.

Referring to reference numerals 1405 and 1407, the electronic device, may determine whether to perform the voice recognition on the utterances received through at least one microphone on the basis of at least some of the determined initial model parameter. For example, the electronic device may determine whether the initial model parameter exceeds the reference error rate value on the basis of at least one of the characteristics information of the microphone of the electronic device receiving the utterances and the surrounding environment information of the electronic device. The electronic device may set the adaptive voice recognition model of reference numeral 1411 when the determined parameter is less than the reference error rate value. The electronic device may change the initial model parameter of reference numeral 1409 when the determined initial model parameter exceeds the reference error rate value included in the pre-stored voice recognition model.

The electronic device, may determine the adaptive voice recognition model of reference numeral 1411 on the basis of the preset repetition frequency or determine whether to change the initial model parameter of reference numeral 1409.

Figure 15:
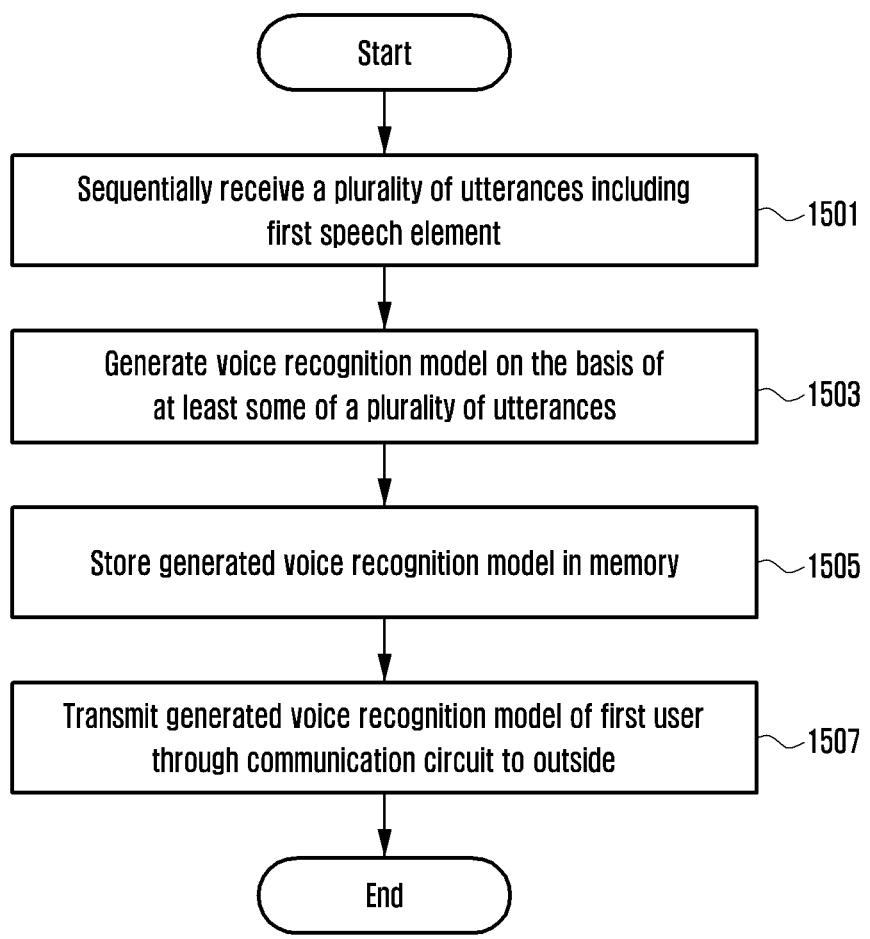
FIG. 15 is a flow chart of modeling voice recognition by the electronic device, according to an embodiment of the present disclosure.

FIG. 15 is a flow chart of modeling the voice recognition by the electronic device 101 according to an embodiment of the present disclosure.

Referring to FIG. 15, in step 1501, the electronic device 101 sequentially receives the plurality of utterances including the first speech element. The electronic device 101, according to an embodiment of the present disclosure, may sequentially receive the plurality of utterances including the first speech element from the first user through at least one microphone.

In step 1503, the electronic device 101 generates the voice recognition model on the basis of the at least some of the plurality of utterances. The electronic device 101, according to an embodiment of the present disclosure, may generate the voice recognition model of the first user on the basis of at least some of the plurality of utterances. The voice recognition model may be associated with at least one of the hidden Markov model (HMM) and the artificial neural network (ANN).

When receiving the utterances of the first user through the microphone, the voice recognition model, according to an embodiment of the present disclosure, may further include at least one of the characteristic information of the microphone and the environment information surrounding the electronic device 101.

The electronic device 101, may calculate the error rate occurring when the at least one application program or the software program is triggered, on the basis of at least some of the parameters generated on the basis of at least one of the plurality of utterances. The electronic device 101 may change the at least one parameter when the calculated error rate is equal to or greater than the threshold value and may associate the least one parameter with the voice signal when the calculated error rate is less than the threshold value.

The electronic device 101, may calculate the error rate on the basis of the at least one changed parameter when the calculated error rate is equal to or greater than the threshold value.

The electronic device 101, may repeat the change in the at least one parameter and the calculation of the error rate until the calculated error rate is less than the threshold value when the calculated error rate is equal to or greater than the threshold value.

The electronic device 101 may count the repetition frequency of the change in the at least one parameter and the prediction of the error rate, and associate the at least one changed parameter with the voice signal upon repeating as many as the selected frequency, when the counted repetition frequency reaches the selected frequency.

In step 1505, the electronic device 101 stores the generated voice recognition model in the memory 130. The electronic device 101, according to an embodiment of the present disclosure, may store the plurality of utterances received through at least one microphone in the memory.

In step 1507, the electronic device 101 transmits the generated voice recognition model of the first user to the outside through the communication circuit. The electronic device 101, according to an embodiment of the present disclosure, may transmit the voice recognition model of the first user generated when performing the voice recognition on the utterances including the first speech element of the first user to the outside through the communication circuit so that the first external device may use the generated voice recognition model of the first user. For example, the electronic device 101 may transmit the generated voice recognition model of the first user to the server, which may communicate with the first electronic device, through the communication circuit.

The electronic device 101, may transmit the data or the signals including or representing at least some of the plurality of stored utterances to the outside through the communication circuit.

The electronic device 101, may receive the utterances including the first speech element from the first user through the microphone after the voice recognition model of the first user is generated. The electronic device 101 may use the voice recognition model of the first user to perform the voice recognition on the received utterance. The electronic device 101 may execute the at least one application program or the software program on the basis of the result of the voice recognition.

Figure 16:
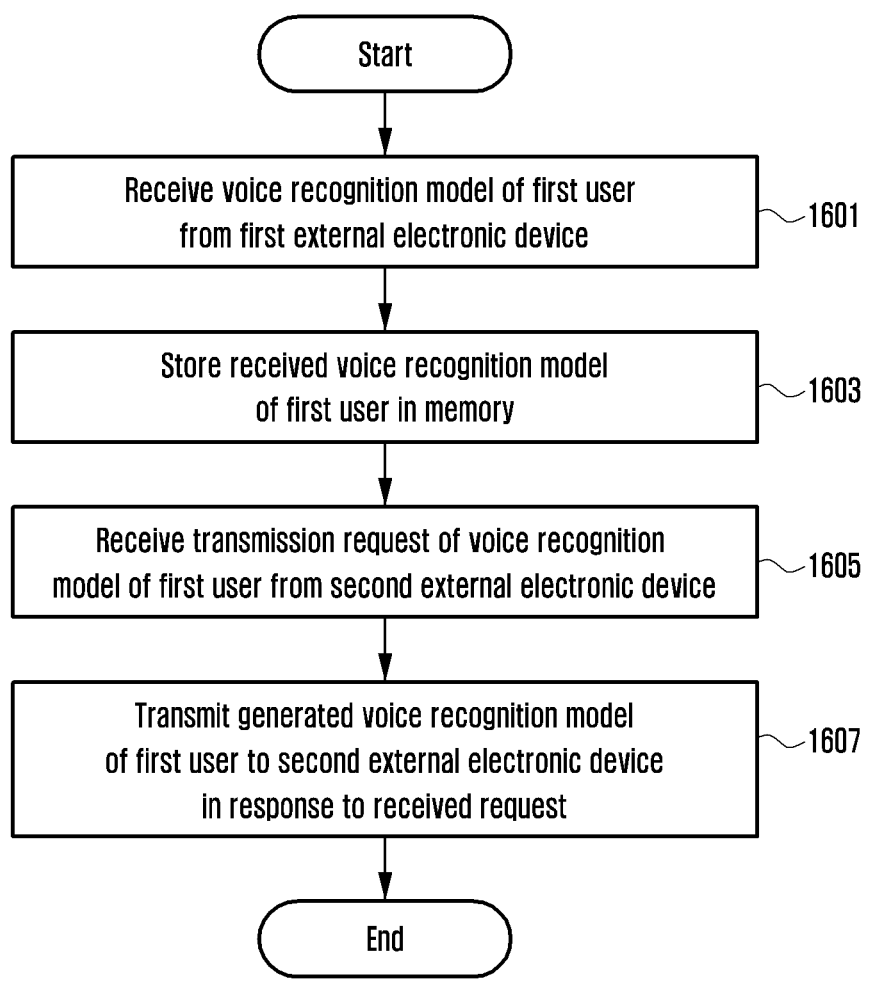
FIG. 16 is a flow chart of voice recognition data processing of the server, according to an embodiment of the present disclosure.

FIG. 16 is a flow chart of processing the voice recognition data by the electronic device 101, according to an embodiment of the present disclosure.

Referring to FIG. 16, in step 1601, the electronic device 101 receives the voice recognition model of the first user from the first external electronic device. The electronic device 101, according to an embodiment of the present disclosure, may receive the voice recognition model of the first user, which is generated by sequentially receiving the plurality of utterances including the first speech element received from the first user through the first microphone of the first external electronic device, through the communication circuit.

In step 1603, the electronic device 101 stores the received voice recognition model of the first user in the memory 130.

In step 1605, the electronic device 101 receives the transmission request of the voice recognition model of the first user from the second external electronic device.

In step 1607, the electronic device 101 transmits the generated voice recognition model of the first user to the second external electronic device in response to the received request. The electronic device 101, according to an embodiment of the present disclosure, may transmit the generated voice recognition model of the first user to the second external electronic device through the communication circuit so that the second external electronic device may use the generated voice recognition model of the first user when performing the voice recognition on the utterances including the first speech element of the first user in response to the received request.

The voice recognition model, may be associated with at least one of the hidden Markov model (HMM) and the artificial neural network (ANN).

When receiving the utterances of the first user through the first microphone, the voice recognition model, according to an embodiment of the present disclosure, may further include at least one of the characteristics information of the first microphone and the environment information surrounding the first external electronic device.

Figure 17:
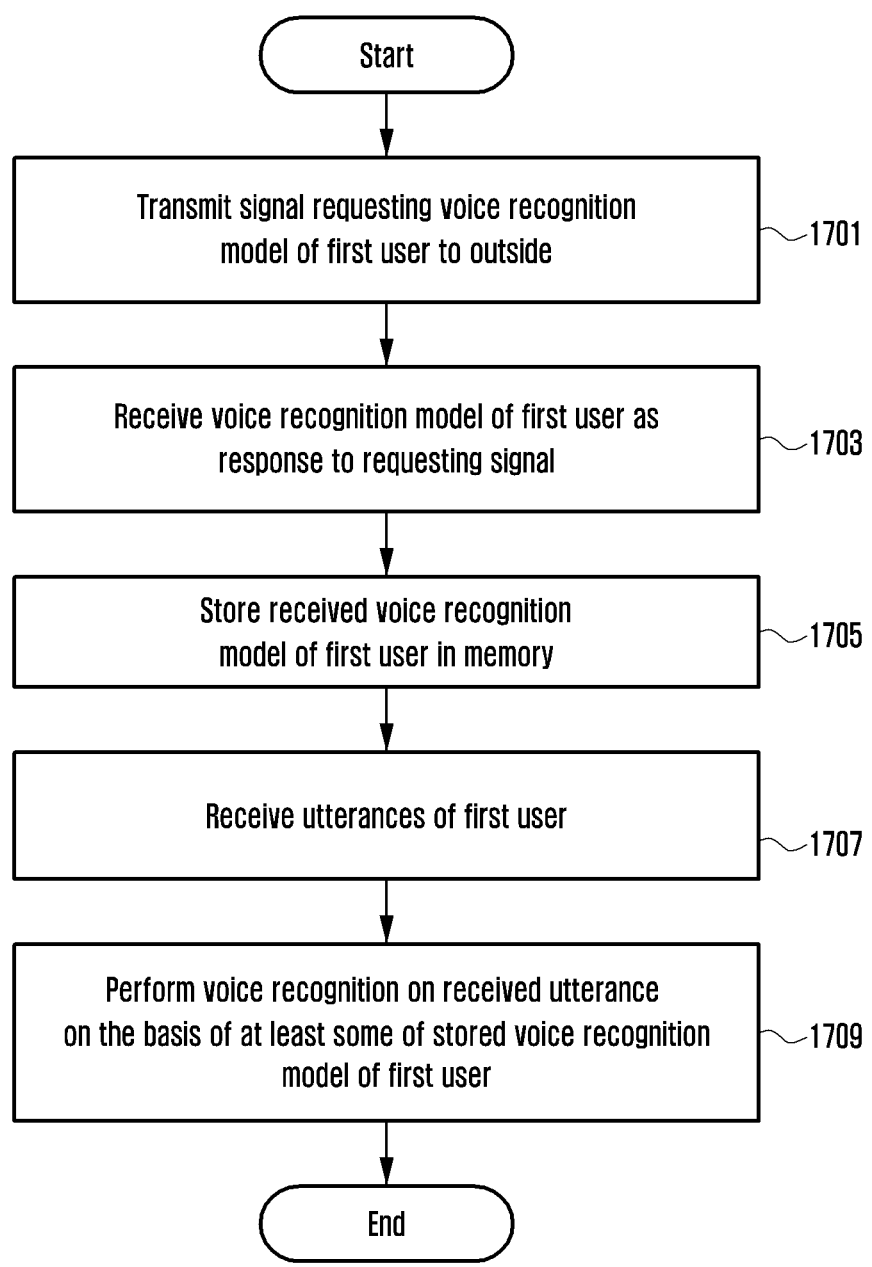
FIG. 17 is a flow chart of adaptively modeling voice recognition of the electronic device, according to an embodiment of the present disclosure.

FIG. 17 is a flow chart of adaptively modeling voice recognition of the electronic device 101, according to an embodiment of the present disclosure.

Referring to FIG. 17, in step 1701, the electronic device 101 transmits the signal requesting the voice recognition model of the first user to the outside. The electronic device 101, according to an embodiment of the present disclosure, may transmit the signal requesting the voice recognition model of the first user, which is generated by sequentially receiving the plurality of utterances including the first speech element received from the first user through the first microphone of the first external electronic device, to the outside through the communication circuit.

In step 1703, the electronic device 101 receives the voice recognition model of the first user in response to the requesting signal.

In step 1705, the electronic device 101 stores the received voice recognition model of the first user in the memory 130.

In step 1707, the electronic device 101 receives the utterances of the first user. The electronic device 101, according to an embodiment of the present disclosure, may receive the utterances including the first speech element through at least one microphone.

In step 1709, the electronic device 101 performs the voice recognition on the received utterances on the basis of at least some of the stored voice recognition model of the first user.

The electronic device 101, may use at least some of the utterances including the first speech element of the first user received through at least one microphone to change at least some of the received voice recognition model of the first user.

The electronic device 101, may receive the utterances including the first speech element of the first user through at least one microphone after at least some of the received voice recognition model of the first user is changed. The voice recognition for the received utterances may be performed on the basis of at least some of the voice recognition model of the first user that is at least partially changed.

The voice recognition model, may be associated with at least one of the hidden Markov model (HMM) and the artificial neural network (ANN).

When receiving the utterances of the first user through the microphone, the voice recognition model may further include at least one of the characteristics information of the microphone and the environment information surrounding the electronic device.

A voice recognition method of an electronic device, may perform any one of sequentially receiving a plurality of utterances including a first speech element from a first user though at least one microphone, generating a voice recognition model of the first user on the basis of at least some of the plurality of utterances, storing the generated voice recognition model in the memory, transmitting the generated voice recognition model of the first user to the outside through the communication circuit so that a first external device may use the generated voice recognition model of the first user, when performing the voice recognition on the utterances including the first speech element of the first user, storing the plurality of received utterances in the memory, an transmitting data or signals including or representing at least some of the plurality of stored utterances to the outside through the communication circuit, transmitting the generated voice recognition model of the first user to a server, which may communicate with the first electronic device, through the communication circuit, receiving the utterances including the first speech element from the first user through the microphone after the voice recognition model of the first user is generated, performing the voice recognition on the received utterances using the voice recognition model of the first user, and executing the at least one application program or the software program on the basis of the result of the voice recognition.

The voice recognition model, may be associated with at least one of a hidden Markov model (HMM) and an artificial neural network (ANN).

When receiving the utterances of the first user through the microphone, the voice recognition model, according to an embodiment of the present disclosure, may further include at least one of the characteristics information of the microphone and the environment information surrounding the electronic device.

The electronic device, may perform any one of calculating an error rate occurring when the at least one application program or the software program is triggered on the basis of at least some of the parameters generated on the basis of at least one of the plurality of utterances, changing the at least one parameter when the calculated error rate is equal to or greater than the threshold value, associating the at least one parameter with the voice signal when the calculated error rate is less than the threshold value, calculating the error rate on the basis of the at least one changed parameter when the calculated error rate is equal to or greater than the threshold value, repeating the change in at least one parameter and the calculation of the error rate until the calculated error rate is less than the threshold value when the calculated error rate is equal to or greater than the threshold value, and counting the repetition frequency of the change in the at least one parameter and the prediction of the error rate and associating at least one changed parameter with the voice signal upon repeating as many as the selected frequency, when the counted repetition frequency reaches the selected frequency, which may be stored in the memory.

The electronic device, may perform any one of receiving the voice recognition model of the first user, which is generated by sequentially receiving the plurality of utterances including the first speech element received from the first user through the first microphone of the first external electronic device, through the communication circuit, storing the received voice recognition model of the first user in the memory, receiving a transmission request of the voice recognition model of the first user from the second external electronic device through the communication circuit, and transmitting the generated voice recognition model of the first user to the second external electronic device through the communication circuit so that the second external electronic device may use the generated voice recognition model of the first user when performing the voice recognition on the utterances including the first speech element of the first user in response to the received request.

The voice recognition model, may be associated with at least one of a hidden Markov model (HMM) and an artificial neural network (ANN).

When receiving the utterances of the first user through the first microphone, the voice recognition model, may further include at least one of the characteristics information of the first microphone and the environment information surrounding the first external electronic device.

The electronic device, may perform any one of transmitting, by the first external electronic device including the first microphone, the signal requesting the voice recognition model of the first user generated by sequentially receiving the plurality of utterances including the first speech element from the first user to the outside through the communication circuit, receiving the voice recognition model of the first user provided as the response to the requested signal through the communication circuit, the received voice recognition model of the first user in the memory, receiving the utterances including the first speech element of the first user through at least one microphone, performing the voice recognition on the received utterances on the basis of at least some of the stored voice recognition model of the first user, changing at least some of the received voice recognition model of the first user on the basis of at least some of the utterances including the first speech element of the first user received through at least one microphone, receiving the utterances including the first speech element of the first user through at least one microphone after at least some of the received voice recognition model of the first user is changed, and performing the voice recognition for the received utterances on the basis of at least some of the voice recognition model of the first user that is at least partially changed.

The voice recognition model may be associated with at least one of a hidden Markov model (HMM) and an artificial neural network (ANN).

When receiving the utterances of the first user through the microphone, the voice recognition model, according to an embodiment of the present disclosure, may further include at least one of the characteristics information of the microphone and the environment information surrounding the electronic device.

In a non-transitory, computer readable storage medium in which a program is recorded, the program may include operation related instructions of the electronic device 101.

According to an embodiment of the present disclosure, it is possible to increase user convenience and reduce unnecessary performance of the processor by inputting the voice signal from one electronic device and adaptively using the voice signals input from a plurality of electronic devices.

According to an embodiment of the present disclosure, the reception of the voice input required to activate the voice input related program may be considered based on the noise associated with the surrounding environment of the electronic device improving the accuracy of the voice input in the electronic device and increase user convenience.

The term "module" as used in this disclosure may refer to a certain unit that includes one of hardware, software and firmware or any combination thereof. The term module may be interchangeably used with the terms unit, logic, logical block, component, or circuit, for example. The module may be the minimum unit, or part thereof, which performs one or more particular functions. The module may be formed mechanically or electronically. For example, the module disclosed herein may include at least one of an ASIC (application-specific integrated circuit) chip, FPGAs (field-programmable gate arrays), and programmable-logic devices, which have been known or are to be developed.

Embodiments of the present disclosure disclosed in the specification and the drawings are examples to describe the details of the present disclosure and assist in understanding of the present disclosure, but do not limit the scope of the present disclosure. It will be apparent to those having ordinary knowledge in the technical field to which the present disclosure pertains, that it is possible to practice other modified embodiments based on the technical idea of the present disclosure as well as the embodiments disclosed herein.

Accordingly, the scope of the present disclosure is defined by the appended claims and their equivalents, and it will be construed that all corrections and modifications derived from the meanings and scope of the following claims and their equivalents fall within the scope of the present disclosure.

What is claimed is:

1. An electronic device, comprising:
   at least one microphone;
   a communication circuit;
   a processor electrically connected to the at least one microphone and the communication circuit; and
   a memory electrically connected to the processor,
   wherein the memory:
   stores at least one of an application program and a software program executing a voice instruction, which is triggered in response to a voice input; and
   stores instructions that cause, when executed by the processor, the processor to:
   sequentially receive a plurality of utterances including a first speech element from a first user through the at least one microphone,
   generate a voice recognition model of the first user on the basis of at least some of the plurality of utterances, the voice recognition model comprising at least one of characteristic information of the at least one microphone and environment information surrounding the electronic device,
   store the generated voice recognition model in the memory,
   transmit the generated voice recognition model of the first user to the outside through the communication circuit so that a first external device uses the generated voice recognition model of the first user when performing voice recognition on the utterances including the first speech element of the first user,
   calculate an error rate occurring when at least one of the application program and the software program is triggered on the basis of at least one parameter generated on the basis of at least one of the plurality of utterances,
   determine, based on at least one of the characteristic information of the at least one microphone and the environment information, whether the calculated error rate is greater than or equal to a threshold value,
   when the calculated error rate is greater than or equal to the threshold value, change the at least one parameter, count a repetition frequency of the changed at least one parameter, and if the counted repetition frequency reaches the selected frequency, associate the changed at least one parameter with a voice signal, and
   when the calculated error rate is less than the threshold value, associate the at least one parameter with the voice signal.

2. The electronic device of claim 1, wherein the instructions cause the processor, when executed by the processor, to:
   store the plurality of received utterances in the memory, and
   transmit data or signals including or representing at least some of the plurality of stored utterances to the outside through the communication circuit.

3. The electronic device of claim 1, wherein the instructions cause the processor, when executed by the processor, to transmit the generated voice recognition model of the first user to a server, which communicates with the first electronic device, through the communication circuit.

4. The electronic device of claim 1, wherein after the voice recognition model of the first user is generated, the instructions cause the processor, when executed by the processor, to:
   receive the utterances including the first speech element from the first user through the microphone,
   perform the voice recognition on the received utterances on the basis of the voice recognition model of the first user, and execute at least one of the application program and the software program on the basis of a result of the voice recognition.

5. The electronic device of claim 1, wherein the voice recognition model is associated with at least one of a hidden Markov model (HMM) and an artificial neural network (ANN).

6. The electronic device of claim 1, wherein the instructions cause the processor, when executed by the processor, to calculate the error rate on the basis of the at least one changed parameter when the calculated error rate is equal to or greater than the threshold value.

7. The electronic device of claim 6, wherein the instructions cause the processor, when executed by the processor, to repeat a change in the at least one parameter and the calculation of the error rate until the calculated error rate is less than the threshold value when the calculated error rate is greater than or equal to the threshold value.

8. An electronic device, comprising:
a communication circuit configured to communicate with a first external device including a first microphone and a second external electronic device including a second microphone;
a processor electrically connected to the communication circuit; and
a memory electrically connected to the processor,
wherein the memory stores instructions that cause, when executed by the processor, the processor to:
receive a voice recognition model of the first user, which is generated by sequentially receiving a plurality of utterances including a first speech element received from a first user through the first microphone of the first external electronic device from the first external electronic device through the communication circuit, the voice recognition model comprising at least one of characteristic information of the at least one microphone and environment information surrounding the electronic device,
store the received voice recognition model of the first user in the memory,
receive a transmission request of the voice recognition model of the first user from the second external electronic device through the communication circuit, and
transmit the generated voice recognition model of the first user to the second external electronic device through the communication circuit so that the second external electronic device uses the generated voice recognition model of the first user when performing the voice recognition on the utterances including the first speech element of the first user in response to the received request,
wherein at least one of the characteristic information of the at least one microphone and the environment information is used by at least one of the first external electronic device and the second external electronic device to determine whether an error rate is greater than or equal to a threshold value,
wherein the error rate occurs when at least one of the first external electronic device and the second external electronic device performs voice recognition on the basis of at least one parameter generated on the basis of at least one of the plurality of utterances, and
wherein, when the calculated error rate is greater than or equal to the threshold value, the at least one parameter is changed, a repetition frequency of the changed at least one parameter is counted, and if the counted repetition frequency reaches a selected frequency, the changed at least one parameter is associated with a voice signal, and
wherein, when the calculated error rate is less than the threshold value, the at least one parameter is associated with the voice signal.

9. The electronic device of claim 8, wherein the voice recognition model is associated with at least one of a hidden Markov model (HMM) and an artificial neural network (ANN).

10. An electronic device, comprising:
a communication circuit;
at least one microphone;
a processor electrically connected to the communication circuit and the at least one microphone; and
a memory electrically connected to the processor,
wherein the memory stores at least one of an application program and a software program executing voice instructions, which is triggered in response to a voice input, and stores instructions that cause, when executed by the processor, the processor to:
transmit a signal requesting a voice recognition model of a first user, which is generated by sequentially receiving a plurality of utterances including a first speech element received from the first user through a first microphone of a first external electronic device to the outside through the communication circuit,
receive the voice recognition model of the first user provided as a response to the requested signal through the communication circuit, the voice recognition model comprising at least one of characteristic information of the at least one microphone and environment information surrounding the electronic device,
store the received voice recognition model of the first user in the memory,
receive the utterances including the first speech element from the first user through the at least one microphone,
perform voice recognition on the received utterances on the basis of at least some of the stored voice recognition model of the first user,
calculate an error rate occurring when at least one of the application program and the software program is triggered on the basis of at least one parameter generated on the basis of at least one of the plurality of utterances,
determine, based on at least one of the characteristic information of the at least one microphone and the environment information, whether the calculated error rate is greater than or equal to a threshold value,
when the calculated error rate is greater than or equal to the threshold value, changing the at least one parameter, counting a repetition frequency of the changed at least one parameter, and if the counted repetition frequency reaches the selected frequency, associating the changed at least one parameter with a voice signal, and
when the calculated error rate is less than the threshold value, associating the at least one parameter with the voice signal.

11. The electronic device of claim 10, wherein the instructions cause the processor, when executed by the processor, to at least partially change the received voice recognition model of the first user on the basis of at least some of the utterances including the first speech element of the first user received through the at least one microphone.

12. The electronic device of claim 11, wherein after the received voice recognition model of the first user is at least partially changed, the instructions cause the processor, which when executed by the processor, to:
receive the utterances including the first speech element from the first user through the at least one microphone, and
perform the voice recognition on the received utterances on the basis of at least some of the at least partially changed voice recognition model of the first user.

13. The electronic device of claim 11, wherein the voice recognition model is associated with at least one of a hidden Markov model (HMM) and an artificial neural network (ANN).

14. A voice recognition method of an electronic device, comprising:
sequentially receiving a plurality of utterances including a first speech element from a first user though at least one microphone;
generating a voice recognition model of the first user on the basis of at least some of the plurality of utterances, the voice recognition model comprising at least one of characteristic information of the at least one microphone and environment information surrounding the electronic device;
storing the generated voice recognition model in the memory;
transmitting the generated voice recognition model of the first user to the outside through the communication circuit so that a first external device uses the generated voice recognition model of the first user when performing voice recognition on the utterances including the first speech element of the first user;
calculating an error rate occurring when at least one of the application program and the software program is triggered;
determining, based on at least one of the characteristic information of the at least one microphone and the environment information, whether the calculated error rate is greater than or equal to a threshold value; and
when the calculated error rate is greater than or equal to the threshold value, changing the at least one parameter, counting a repetition frequency of the changed at least one parameter, and if the counted repetition frequency reaches the selected frequency, associating the changed at least one parameter with the voice signal, and
associating the at least one parameter with the voice signal when the calculated error rate is less than the threshold value.

15. The voice recognition method of claim 14, further comprising:
storing the plurality of received utterances in the memory; and
transmitting data or signals including or representing at least some of the plurality of stored utterances to the outside through the communication circuit.

16. The voice recognition method of claim 14, wherein transmitting the generated first voice recognition model of the first user to the outside through the communication circuit includes transmitting the generated voice recognition model of the first user to a server, which communicates with the first electronic device, through the communication circuit.

17. The voice recognition method of claim 14, wherein after the voice recognition model of the first user is generated, receiving the utterances including the first speech element from the first user through the microphone includes performing the voice recognition on the received utterances on the basis of the voice recognition model of the first user and executing at least one of the application program and the software program on the basis of the result of the voice recognition.

18. The voice recognition method of claim 14, wherein the voice recognition model is associated with at least one of a hidden Markov model (HMM) and an artificial neural network (ANN).

19. The voice recognition method of claim 14, further comprising:
calculating the error rate on the basis of the at least one changed parameter when the calculated error rate is greater than or equal to the threshold value.

20. The voice recognition method of claim 19, further comprising:
repeating a change in the at least one parameter and a calculation of the error rate until the calculated error rate is less than the threshold value when the calculated error rate is equal to or greater than the threshold value.

21. A voice recognition method of an electronic device, comprising:
receiving a voice recognition model of a first user, which is generated by sequentially receiving a plurality of utterances including a first speech element received from the first user through a first microphone of a first external electronic device from the first external electronic device, through a communication circuit, the voice recognition model comprising at least one of characteristic information of the at least one microphone and environment information surrounding the electronic device;
storing the received voice recognition model of the first user in a memory;
receiving a transmission request of the voice recognition model of the first user from a second external electronic device through the communication circuit; and
transmitting the generated voice recognition model of the first user to the second external electronic device through the communication circuit so that the second external electronic device uses the generated voice recognition model of the first user when performing the voice recognition on the utterances including the first speech element of the first user in response to the received request,
wherein at least one of the characteristic information of the at least one microphone and the environment information is used by at least one of the first external electronic device and the second external electronic device to determine whether an error rate is greater than or equal to a threshold value,
wherein the error rate occurs when at least one of the first external electronic device and the second external electronic device performs voice recognition on the basis of at least one parameter generated on the basis of at least one of the plurality of utterances,
wherein, when the calculated error rate is greater than or equal to the threshold value, the at least one parameter is changed, a repetition frequency of the changed at least one parameter is counted, and if the counted repetition frequency reaches a selected frequency, the changed at least one parameter is associated with a voice signal, and
wherein, when the calculated error rate is less than the threshold value, the at least one parameter is associated with the voice signal.

22. The voice recognition method of claim 21, wherein the voice recognition model is associated with at least one of a hidden Markov model (HMM) and an artificial neural network (ANN).

23. A voice recognition method of an electronic device, comprising:
   transmitting a signal requesting a voice recognition model of a first user, which is generated by sequentially receiving a plurality of utterances including a first speech element received from the first user through a first microphone of a first external electronic device, to the outside through a communication circuit;
   receiving the voice recognition model of the first user provided as a response to the requested signal through the communication circuit, the voice recognition model comprising at least one of characteristic information of the at least one microphone and environment information surrounding the electronic device;
   storing the received voice recognition model of the first user in a memory;
   receiving the utterances including the first speech element from the first user through the at least one microphone;
   performing the voice recognition on the received utterances on the basis of at least some of the stored voice recognition model of the first user;
   calculating an error rate occurring when at least one of the application program and the software program is triggered on the basis of at least one parameter generated on the basis of at least one of the plurality of utterances;
   determining, based on at least one of the characteristic information of the at least one microphone and the environment information, whether the calculated error rate is greater than or equal to a threshold value; and
   changing, when the calculated error rate is greater than or equal to the threshold value, the at least one parameter, counting a repetition frequency of the changed at least one parameter, and if the counted repetition frequency reaches the selected frequency, associating the changed at least one parameter with the voice signal, and
   when the calculated error rate is less than the threshold value, associating the at least one parameter with the voice signal.

24. The voice recognition method of claim 23, further comprising:
   at least partially changing the received voice recognition model of the first user on the basis of at least some of the utterances including the first speech element of the first user received through the at least one microphone.

25. The voice recognition method of claim 24, further comprising:
   after the received voice recognition model of the first user is at least partially changed, receiving the utterances including the first speech element from the first user through the at least one microphone; and
   performing the voice recognition on the received utterances on the basis of the at least partially changed voice recognition model of the first user.

26. The voice recognition method of claim 24, wherein the voice recognition model is associated with at least one of a hidden Markov model (HMM) and an artificial neural network (ANN).

* * * * *